US012562132B2

(12) United States Patent
Miura et al.

(10) Patent No.: US 12,562,132 B2
(45) Date of Patent: Feb. 24, 2026

(54) DISPLAY DEVICE

(71) Applicant: Sharp Display Technology Corporation, Kameyama (JP)

(72) Inventors: Takafumi Miura, Kameyama (JP); Masamitsu Kobayashi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 16 days.

(21) Appl. No.: 18/658,339

(22) Filed: May 8, 2024

(65) Prior Publication Data

US 2024/0428743 A1 Dec. 26, 2024

(30) Foreign Application Priority Data

Jun. 23, 2023 (JP) ................................ 2023-103654

(51) Int. Cl.
*G09G 3/34* (2006.01)
*G02B 27/02* (2006.01)
*G02F 1/1335* (2006.01)
*G02F 1/13357* (2006.01)

(52) U.S. Cl.
CPC ......... *G09G 3/3406* (2013.01); *G02B 27/022* (2013.01); *G02F 1/133528* (2013.01); *G02F 1/133603* (2013.01); *G09G 2320/0233* (2013.01)

(58) Field of Classification Search
CPC ......... G09G 3/3406; G09G 2320/0233; G02B 27/022; G02F 1/133528; G02F 1/133603
See application file for complete search history.

(56) References Cited

U.S. PATENT DOCUMENTS

| | | | |
|---|---|---|---|
| 6,529,209 B1 | 3/2003 | Dunn et al. | |
| 2003/0133569 A1 | 7/2003 | Stern et al. | |
| 2011/0285761 A1* | 11/2011 | Yu ......................... | H04N 13/341 |
| | | | 345/691 |
| 2016/0139423 A1* | 5/2016 | Huang ..................... | G02C 1/00 |
| | | | 349/15 |
| 2019/0104277 A1* | 4/2019 | Yang .................. | H04N 5/44504 |
| 2023/0288768 A1* | 9/2023 | Oh ......................... | G02F 1/0136 |

FOREIGN PATENT DOCUMENTS

JP 2001-255844 A 9/2001

* cited by examiner

*Primary Examiner* — Kenneth B Lee, Jr.
(74) *Attorney, Agent, or Firm* — ScienBiziP, P.C.

(57) ABSTRACT

A display device includes a controller configured to generate second image data from first image data, cause a display panel to display a first image based on a first image data and a second image based on a second image data in a time division manner, switch a polarization module to a first polarization state when the first image is displayed and to a second polarization state when a second image is displayed in synchronization with a timing of the time division, and control a backlight to turn off the backlight for a predetermined period from a start of a display period during which the first or second image is displayed on the display panel and then turn on the backlight.

7 Claims, 24 Drawing Sheets

24

241                    242

| FIRST IMAGE DATA (input) | SECOND IMAGE DATA (output) |
|---|---|
| 0 | 255 |
| . . . | . . . |
| 127 | X |
| 128 | Y |
| . . . | . . . |
| 255 | 0 |

FIG. 6

| MAIN IMAGE DATA (input) | SUB IMAGE DATASET A (output-A) | SUB IMAGE DATASET B (output-B) | SUB IMAGE DATASET C (output-C) |
|---|---|---|---|
| 0 | Ua | Ub | 255 |
| ... | ... | ... | ... |
| 63 | Va | Vb | Vc |
| 64 | Wa | Wb | Wc |
| ... | ... | ... | ... |
| 127 | Xa | Xb | Xc |
| 128 | Ya | Yb | Yc |
| ... | ... | ... | ... |
| 255 | 0 | Zb | Zc |

FIG. 21

DISPLAY DEVICE

CROSS-REFERENCE TO RELATED APPLICATIONS

This application claims the benefit of priority to Japanese Patent Application Number 2023-103654 filed on Jun. 23, 2023. The entire contents of the above-identified application are hereby incorporated by reference.

BACKGROUND

Technical Field

The disclosure relates to a display device.

Some information, such as confidential information or private information, is preferable only to be displayed under certain conditions. For example, JP 2001-255844 A discloses a system in which a user viewing a display using a pair of active glasses including lenses with shutters can view private data, while an unauthorized viewer without active glasses can view only private data masked by masking data.

SUMMARY

There is a demand to visually recognize confidential images with good image quality. Therefore, a display device is desired that can ensure confidentiality of specific images and improve the image quality of the images recognized visually.

According to one embodiment, a display device includes a display panel, a polarization module placed overlapping the display panel, the polarization module being capable of actively switching a polarization state between a first polarization state and a second polarization state, a backlight placed overlapping the display panel, and a controller. The controller is configured to generate second image data from first image data, cause the display panel to display a first image based on the first image data and a second image based on the second image data in a time division manner, switch the polarization state of the polarization module to the first polarization state in a case in which the first image is displayed and to the second polarization state in a case in which the second image is displayed in synchronization with a timing of the time division, and by controlling the backlight, turn off the backlight for a predetermined period from a start of a display period during which the first image or the second image is displayed on the display panel and then turn on the backlight.

Further details will be described in the embodiments below.

BRIEF DESCRIPTION OF DRAWINGS

The disclosure will be described with reference to the accompanying drawings, wherein like numbers reference like elements.

FIG. 6 is a diagram showing an example of a lookup table (LUT).

FIG. 21 is a diagram showing another example of the LUT.

DESCRIPTION OF EMBODIMENTS

Figure 1:
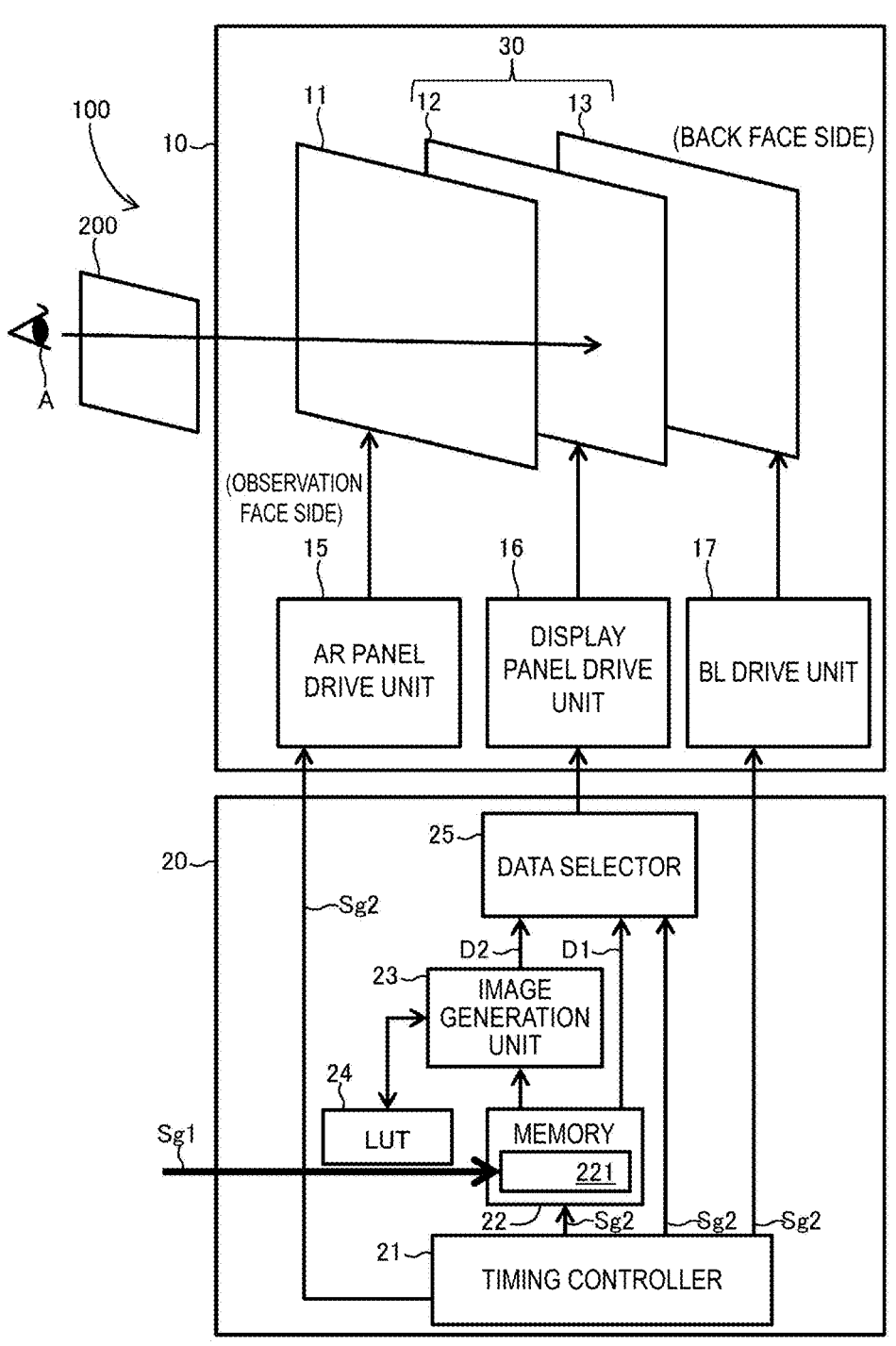
FIG. 1 is a schematic configuration diagram of a display system according to a first embodiment.

1. Outline of Display Device (1) A display device according to an embodiment includes a display panel, a polarization module placed overlapping the display panel, the polarization module being capable of actively switching a polarization state between a first polarization state and a second polarization state, a backlight placed overlapping the display panel, and a controller. The controller is configured to generate second image data from first image data, cause the display panel to display a first image based on the first image data and a second image based on the second image data in a time division manner, switch the polarization state of the polarization module to the first polarization state in a case in which the first image is displayed and to the second polarization state in a case in which the second image is displayed in synchronization with a timing of the time division, and by controlling the backlight, turn off the backlight for a predetermined period from a start of a display period during which the first image or the second image is displayed on the display panel and then turn on the backlight.

A viewer uses polarized glasses that transmit an image displayed on the display panel and emitted in the first polarization state from the polarization module and do not transmit an image displayed on the display panel and emitted in the second polarization state from the polarization module. When wearing these polarized glasses, the viewer visually recognizes only the first image of the first image and the second image displayed on the display panel, which are switched in a time division manner while the backlight is on. When not wearing the polarized glasses, the viewer visually recognizes both the first image and the second image displayed on the display panel, which are switched in a time division manner while the backlight is on. When display switching between the first image and the second image is performed at such a speed that only the first image is not perceived and flicker is not perceived when the viewer is not wearing the polarized glasses, a composite image of the first image and the second image is perceived by the viewer not wearing the polarized glasses. Thus, the first image can be perceived only when wearing the polarized glasses, or only by a user wearing the polarized glasses. At this time, there is no need to change a polarization state of the polarized glasses in synchronization with the display on the display panel. Therefore, it is not necessary to control the polarized glasses by wireless communication or the like. In addition, the polarized glasses do not require a control mechanism and do not require a power supply. Therefore, the display device according to the present embodiment can ensure confidentiality of a specific image (first image) without impairing ease-of-use for users.

Further, in the display device according to the embodiment, the backlight is turned off for a predetermined period (non-lighting period) from the start of the display period during which the first image or the second image is displayed on the display panel, and then the backlight is turned on (during the lighting period). By setting the non-lighting period in a period during which the luminance is unstable, for example, immediately after the first image or the second image is written to the display panel, and setting the lighting period in a period during which the luminance is stable, the image is illuminated from the display panel with stable luminance. This improves quality of the first image visually recognized when the viewer is not wearing the polarized glasses.

(2) In the display device according to (1), preferably, switching the polarization state of the polarization module includes dividing the polarization module into multiple segments along a scanning direction and switching the polarization states of the multiple segments in turn along the scanning direction with a time difference. Thus, at each position in the scanning direction of the display panel, the polarization module is in the first polarization state during a period when the first image is illuminated with stable luminance. Therefore, compared to a case in which the polarization state of an entire polarization module is uniformly switched at the start of display of each image, differences in luminance (unevenness) of the first image that are visually recognized when the viewer is wearing the polarized glasses described above is suppressed. In addition, the luminance of the display panel is stabilized. As a result, the display quality when the viewer is wearing the polarized glasses is improved.

(3) In the display device according to (2), preferably, controlling the backlight includes turning on the backlight during a period in which all polarization states of the multiple segments of the polarization module are in the first polarization state or the second polarization state. This improves quality of the first image visually recognized when the viewer is not wearing the polarized glasses.

(4) In the display device according to (2), preferably, controlling the backlight includes turning on the backlight during a period in which all polarization states of the multiple segments of the polarization module are in the first polarization state in a case in which the first image is displayed or in the second polarization state in a case in which the second image is displayed. This improves quality of the first image visually recognized when the viewer is not wearing the polarized glasses.

(5) In the display device according to (4), preferably, a light-emitting face of the backlight is divided into the multiple segments, and controlling the backlight includes turning off the multiple segments one by one in turn along the scanning direction in the display panel for the predetermined period from a start of writing the first image or the second image to an area in the display panel corresponding to each of the multiple segments, and then turning on the multiple segments. Thus, compared to a case in which an entire back panel is uniformly turned off and turned on, the first image is illuminated with stable luminance at each position on the display panel in the scanning direction.

(6) In the display device according to any one of (1) to (5), preferably, controlling the backlight includes making an amount of light emitted from the backlight different between a display period during which the first image is displayed and a display period during which the second image is displayed. Thus, the amount of light emitted from the backlight can be made different between the first display period and the second display period depending on characteristics such as response conditions of the display panel and the polarization module. As a result, the luminance of the image illuminated from the display panel is more stable.

(7) In the display device according to (6), preferably, making the amount of light emitted from the backlight different includes making a length of a period during which the backlight is turned on different between the display period during which the first image is displayed and the display period during which the second image is displayed. Thus, the amount of light emitted from the backlight can be made different between the first display period and the second display period.

(8) In the display device according to any one of (1) to (7), preferably, in the first polarization state, the first image is visually recognized by a viewer through polarized glasses worn by the viewer, and in the second polarization state, the second image is not visually recognized by the viewer through the polarized glasses. Thus, the confidentiality of the first image is easily secured as described above by using the polarized glasses.

(9) In the display device according to any one of (1) to (8), preferably, generating second image data includes converting a gray scale of the image data into a gray scale with a predefined corresponding relationship. Thus, a composite image of the first image and the second image becomes an image having a gray scale according to the predefined relationship.

(10) In the display device according to any one of (1) to (9), preferably, generating the second image data includes dividing the image data into multiple areas and changing to gray scales with predefined corresponding relationships selected for the multiple areas, and the corresponding relationships selected for the multiple areas include at least two types of corresponding relationships. Thus, a composite image of the first image and the second image becomes an image having a gray scale corresponding to the predefined relationship for each of the multiple areas.

2. Examples of Display Device

First Embodiment

FIG. 1 is a schematic configuration diagram of a display system 100 according to a first embodiment. The display system 100 includes a display device 10 and a controller 20 that controls a display in the display device 10. The display device 10 is mounted on, for example, a smartphone, a tablet terminal, a smartwatch, an in-vehicle information display, a personal computer, a monitor for a personal computer, a television, and the like.

Figure 2:
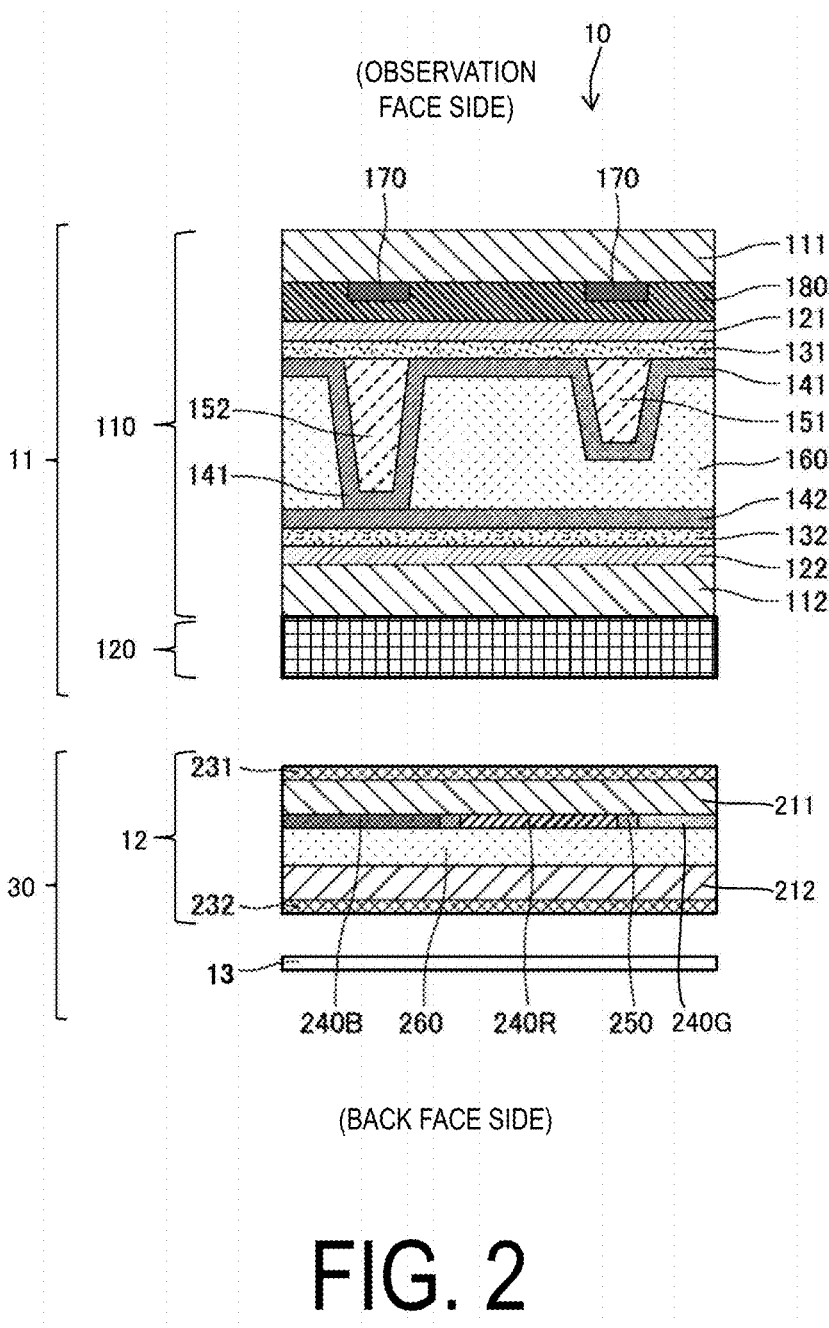
FIG. 2 is a schematic cross-sectional view of a display device included in the display system.

FIG. 2 is a schematic cross-sectional view of the display device 10. The display device 10 includes a display 30 and a polarization module 11 placed overlapping the display 30. Although the polarization module 11 is illustrated spaced apart from the display 30 in FIG. 2, the polarization module 11 and the display 30 may be overlapped with no space or a very small space. The display 30 includes a display panel 12 and a backlight 13 placed overlapping a back face (lower face) of the display panel 12. Although the backlight 13 is illustrated spaced apart from the display panel 12 in FIG. 2, the backlight 13 and the display panel 12 may be overlapped with no space or a very small space. The polarization module 11 is placed on a front face (upper face) of the display panel 12. The display device 10 is viewed by a viewer A from a front face side of the display panel 12. Therefore, the front face of the display panel 12 is also an observation face.

Figure 3:
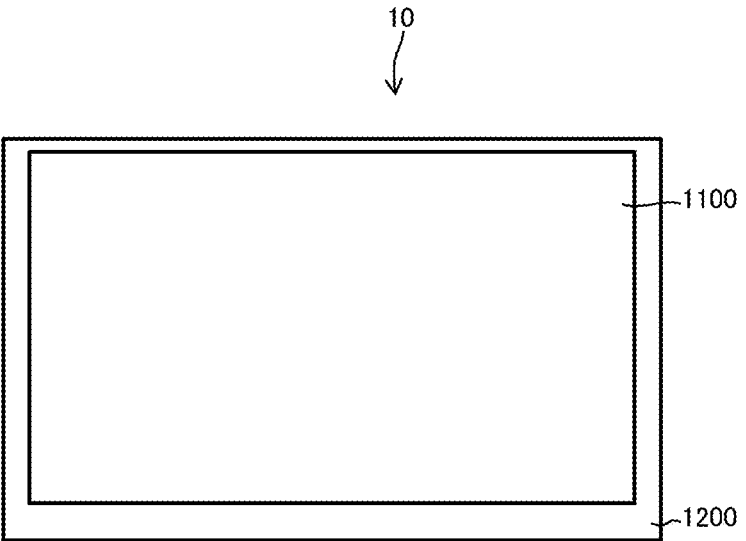
FIG. 3 is a schematic plan view of the display device when viewed from an observation face side.

FIG. 3 is a schematic plan view of the display device 10 when viewed from an observation face side. The display device 10 includes, as an example, a display region 1100 and a frame region 1200 placed in a frame shape at an outer edge of the display region 1100. The display region 1100 is a region in which any image or the like is displayed. That is, the display region 1100 is a region that is visually recognized from the observation face side of the display device 10 when the backlight 13 is turned on. The frame region 1200 does not transmit light. The display device 10 does not need to include the frame region 1200.

The display panel 12 includes multiple pixels. Preferably, the display panel 12 includes the multiple pixels arranged in a matrix. A configuration of the display panel 12 is not limited. The display panel 12 may have, for example, a structure in which a liquid crystal layer is sandwiched between a pair of substrates. In detail, the display panel 12 may have a structure in which a liquid crystal layer is sandwiched between a pair of substrates, one of which includes a pixel electrode and a common electrode formed thereon, and display is made by applying a voltage between the pixel electrode and the common electrode to apply a transverse electrical field (including a fringe electrical field) to the liquid crystal layer. As another example, the display panel 12 may have a structure in which a liquid crystal layer is sandwiched between a pair of substrates in which a pixel electrode is formed on one substrate and a common electrode is formed on the other substrate, and display is made by applying a voltage between the pixel electrode and the common electrode to apply a vertical electrical field to the liquid crystal layer. Examples of the transverse electrical field mode include FFS mode and IPS mode. Examples of the vertical electrical field mode include Vertical Alignment (VA) mode and Twisted Nematic (TN) mode.

A liquid crystal mode of the display panel 12 is not limited. The liquid crystal mode of the display panel 12 may be, for example, a mode in which black is displayed by aligning liquid crystal molecules in a liquid crystal layer 260 perpendicular to a substrate plane, or a mode in which black is displayed by aligning the liquid crystal molecules in the liquid crystal layer 260 in a direction parallel to the substrate plane or in a direction neither perpendicular nor parallel to the substrate plane. Examples of drive methods of the display panel 12 include a TFT method (active matrix method), a simple matrix method (passive matrix method), and a plasma address method.

The display panel 12 has, as an example, a structure in which the liquid crystal layer 260 is sandwiched between a pair of substrates 211 and 212, and they are sandwiched by insulating films 231 and 232. One of the substrates (the substrate 211) is provided with a pixel electrode and a common electrode (not illustrated). A black matrix layer (BM layer) 250 and color filter layers 240 (a blue color filter layer 240B, a red color filter layer 240R, and a green color filter layer 240G) regularly arranged between adjacent portions of the BM layer are formed in the substrate 211. The display panel 12 preferably includes the BM layer 250 arranged in a lattice pattern in a plan view.

The display panel 12 is connected to a display panel drive unit 16 that enables display. Under control of the display panel drive unit 16, the display panel 12 sequentially displays a main image (first image) and a sub image (second image), which will be described later, while switching them in a time division manner.

The backlight 13 includes, as an example, multiple light sources and is, for example, a scanning backlight in which the multiple light sources can be controlled individually. The light sources are light emitting diodes (LEDs) as an example.

The backlight 13 is connected to a backlight (BL) drive unit 17, and the BL drive unit 17 individually controls on/off of the multiple light sources (not illustrated). As will be described later, when the display panel drive unit 16 sequentially displays a first image and a second image, which will be described later, on the display panel 12 while switching them in a time division manner, the BL drive unit 17 controls the backlight 13 in synchronization with a display switching timing.

The polarization module 11 is a panel including an active retarder as an example. The polarization module 11 is switched to multiple polarization states by an Active Retarder (AR) panel drive unit 15. Under control of the AR panel drive unit 15, a polarization state of the polarization module 11 is switched between a first polarization state and a second polarization state in synchronization with switching between the main image (first image) and the sub image (second image) on the display panel 12. As an example, the polarization module 11 is in the first polarization state when the display panel 12 displays the first image, and the polarization module 11 is in the second polarization state when the display panel 12 displays the second image.

The viewer A views the display in the display region 1100 using removable polarized glasses 200. Note that the polarized glasses 200 do not have a shutter function. When the viewer A is wearing the polarized glasses 200, a display displayed on the display panel 12 and illuminated from behind by the turned-on backlight 13 is given a polarization state by the polarization module 11 and reaches eyes of the viewer A through the polarized glasses 200. When the viewer A is not wearing the polarized glasses 200, a display displayed on the display panel 12 and illuminated from behind by the turned-on backlight 13 is given a polarization state by the polarization module 11 and reaches the eyes of the viewer A without passing through the polarized glasses 200. In the following description, "an image is displayed on the display panel 12 and illuminated from behind by the turned-on backlight 13" is expressed as "a display or an image is illuminated from the display panel 12". When the viewer A captures a display illuminated from the display panel 12 in his/her field of view, it is referred to as "visual recognition", and when the viewer A perceives the display captured in his/her field of view with a meaning, it is referred to as "perception".

The polarized glasses 200 include polarizing films attached to both lenses. The polarizing film is preferably a circularly polarizing film. The polarizing film is not limited to a circularly polarizing film, and other types of polarizing films may be used.

The polarized glasses 200 transmit an image illuminated from the display panel 12 for the first polarization state in the polarization module 11 and do not transmit an image illuminated from the display panel 12 for the second polarization state in the polarization module 11. In other words, in the polarization module 11, the first polarization state is a polarization state in which the first image illuminated from the display panel 12 is transmitted through the polarized glasses 200, and the second polarization state is a polarization state in which the second image illuminated from the display panel 12 is not transmitted through the polarized glasses 200.

Thus, when the viewer A is not wearing the polarized glasses 200, the viewer A visually recognizes both the first image and the second image that are illuminated from the display panel 12 when being switched in a time division manner. When the viewer A is wearing the polarized glasses 200, the viewer A visually recognizes only the first image of the first image and the second image that are illuminated from the display panel 12 when being switched in a time division manner. In the display system 100, there is no need to change a polarization state of the polarized glasses 200 in synchronization with the display on the display panel 12. Therefore, it is not necessary to control the polarized glasses 200 by wireless communication or the like. In addition, the polarized glasses 200 do not require a control mechanism and do not require a power supply.

The polarization module 11 includes an optical layered body 110 and a retarder 120. The optical layered body 110 includes a pair of substrates 111 and 112, a pair of electrodes 121 and 122, a liquid crystal layer 160, and columnar spacers 151 and 152. To be more specific, the optical layered body 110 includes, from the observation face side, the first substrate 111, the first electrode 121, the liquid crystal layer 160, the second electrode 122, and the second substrate 112. Light blocking layers 170 for limitedly blocking light to the columnar spacers 151 and 152 are provided between the first substrate 111 and the first electrode 121, and a flattening film 180 is provided between the light blocking layers 170 and the first electrode 121. Between the electrodes 121 and 122 and the liquid crystal layer 160, insulating films 131 and 132 and alignment films 141 and 142 are provided in order from these electrode sides, respectively.

The second spacers 152 are provided to control a thickness of the liquid crystal layer 160. The first spacers 151 are placed in a floating island shape. Thus, the polarization module 11 can be given resistance to surface pressing.

When the first spacers 151 are placed in a floating island shape, it means that the first spacers 151 are placed in a floating island shape in the liquid crystal layer 160. To be specific, this means that the liquid crystal layer 160 is present between the first spacers 151 and the first substrate 111 or the second substrate 112 in a cross-sectional view. That is, a height of the first spacers 151 is smaller than a thickness of the liquid crystal layer 160. On the other hand, a height of the second spacers 152 is equal to the thickness of the liquid crystal layer 160.

The height of the first spacers 151 is smaller than the thickness of the liquid crystal layer 160. That is, when the thickness of the liquid crystal layer 160 is 100%, the height of the first spacers 151 may be a value less than 100%, for example, from 5 to 95%.

The first spacers 151 and the second spacers 152 are formed from, for example, a light transmitting resin material. By forming multiple types of columnar spacers having different heights on one substrate (e.g., the first substrate 111) side, the first spacers 151 and the second spacers 152 can be formed. To be specific, for example, after forming columnar spacers having different heights on the first substrate 111 side, the second substrate 112 is bonded to the first substrate 111 with a liquid crystal material sandwiched therebetween, so that the columnar spacers having a height lower than the thickness of the liquid crystal layer 160 formed from the liquid crystal material become the first spacers 151 and other columnar spacers become the second spacers 152.

The optical layered body 110 includes light blocking portions (also referred to as the light blocking layers) 170 as an example of a light blocking means for limitedly blocking light to the first spacers 151 and the second spacers 152. The light blocking portions 170 are placed at positions overlapping the columnar spacers. By providing such light blocking means, deterioration in display performance due to retardation shift around the columnar spacers can be sufficiently suppressed.

When the light blocking portion 170 is placed at a position overlapping the columnar spacer, it means that 80% to 100% of an area of the columnar spacer overlaps the light blocking layer in a plan view. Preferably, 85% to 100%, more preferably 90% to 100% of the area of the columnar spacer overlaps the light blocking layer.

The light blocking portions 170 are formed from a light blocking material. Examples of the light blocking material include a metal black matrix (also referred to as a metal BM) made of a metal and a resin black matrix (also referred to as a resin BM) made of a resin material. Examples of the metal BM include metal films containing aluminum, molybdenum, chromium, titanium, or an alloy thereof. Examples of the resin BM include black resists, among which black photosensitive resins are preferable. Specific examples thereof include a black photosensitive acrylic resin. The light blocking portion 170 may be a single-layer film or a multilayer film.

A light transmittance of the light blocking portion 170 is preferably, for example, from 0 to 18. A thickness of the light blocking portion 170 is not limited. The thickness of the light blocking portion 170 is preferably, for example, from 10 nm to 2 μm. The thickness of the light blocking portion 170 is more preferably from 50 nm to 1.5 μm.

Figure 4:
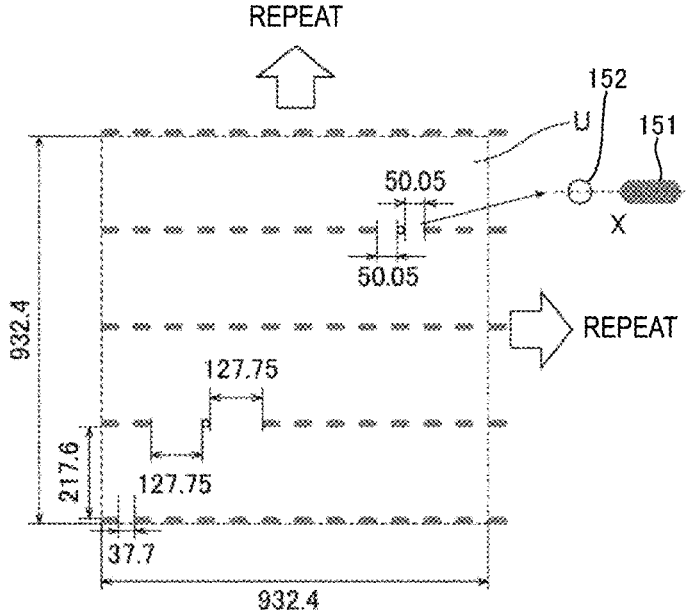
FIG. 4 is a schematic plan view illustrating an example of a layout of first spacers and second spacers included in a polarization module included in the display device.

FIG. 4 is a schematic plan view illustrating an example of a layout of the first spacers 151 and the second spacers 152. A unit of numerals in the figure is μm. A horizontal direction in the figure is parallel to a long side direction of an active area of the polarization module 11, that is, an area corresponding to the display region 1100 of the display device 10. A length of the long side of the display region 1100 is 59.6736 cm, and of pixel pitches of the display panel 12, a length of a pitch B parallel to a long side A of the display region 1100 is 77.7 μm. When the liquid crystal layer 160 is viewed in plan view, a unit having a size of 932.4 μm×932.4 μm is defined as a basic unit (also referred to as a repeating unit) U. The polarization module 11 is configured by repeatedly arranging the basic units U over an entire area of the liquid crystal layer 160. In FIG. 4, one basic unit U is illustrated surrounded by dotted lines. In the basic unit U, 2 second spacers 152 each having a diameter φ of about 15.3 μm and a height of 1.6 μm are arranged, and 44 first spacers 151 each having a shape with a minor axis of about 15 μm, a major axis of 40 μm, a height of 1.3 μm, and quadrant corners are arranged.

In order to obtain the unit U, first, a large number of first spacers 151 are regularly arranged such that a distance (clearance) between a first spacer 151 and another first spacer 151 adjacent thereto in the horizontal direction is set to 37.7 μm, a distance (clearance) between the first spacer 151 and another first spacer 151 adjacent thereto in the vertical direction is set to 217.6 μm. Thereafter, third, fourth, and fifth first spacers 151 from the left in the second row from the bottom (three spacers in total) are removed, and one second spacer 152 (second spacer 152A) is placed at the center position of the area from which the first spacers 151 have been removed. A distance (clearance) between each of first spacers 151*a* and 151*b* on both left and right sides of the removed first spacers 151 (three spacers) and the second spacer 152A placed this time is 127.75 μm. FIG. X on the right side of FIG. 4 illustrates that the second spacer 152A placed here and the first spacers 151*a* and 151*b* adjacent thereto are arranged so that the center positions thereof in the vertical direction are aligned.

Further, a third first spacer 151 (one spacer) from the right in a fourth row from the bottom is also removed, and one second spacer 152 (second spacer 152B) is placed at the center position of the area from which the first spacer 151 has been removed. A distance (clearance) between each of first spacers 151*c* and 151*d* on both left and right sides of the removed first spacer 151 (one spacer) and the second spacer 152B placed this time is 50.05 μm.

The flattening film (also referred to as a flattening layer) 180 for flattening is provided between the light blocking layers 170 and the first electrode 121. The flattening film 180 is preferably, for example, an organic insulating film. As the organic insulating film, for example, an organic film having a low relative dielectric constant (relative dielectric constant ε=2 to 5) such as a photosensitive resin or a layered film thereof can be used. Specific examples of the organic insulating film include organic films made of an acrylic resin, a polyimide resin, and a novolac resin, and layered bodies thereof. A thickness of the flattening film 180 is not limited, and is preferably, for example, from 10 nm to 5 μm. The thickness of the flattening film 180 is more preferably from 30 nm to 3 μm.

The first substrate 111 and the second substrate 112 are preferably transparent substrates. The transparent substrate may be any substrate that transmits visible light. Examples of the transparent substrate include glass substrates and plastic substrates.

The first electrode 121 and the second electrode 122 are preferably transparent electrodes. The transparent electrode can be formed using, for example, a transparent conductive material such as indium tin oxide (ITO), indium zinc oxide (IZO), zinc oxide (ZnO), or tin oxide (SnO), or an alloy thereof.

The first electrode 121 and the second electrode 122 are electrodes placed planarly on entire surfaces of the corresponding substrates, that is, so-called solid electrodes, but may be patterned.

The polarization module 11 is driven in ECB mode as an example. The ECB mode is a mode in which double refraction of the liquid crystal layer 160 is controlled by voltage application, and is classified into horizontal alignment, vertical alignment (VA), and HAN depending on an initial alignment state of liquid crystal molecules. In these modes, a voltage is applied to the liquid crystal layer in the vertical direction. Note that a Fringe Field Switching (FFS) mode, In-Plane Switching (IPS) mode, and the like in which a voltage is applied in a lateral direction can also be regarded as one type of the ECB mode in a sense that the double refraction of the liquid crystal layer is controlled by voltage application. The polarization module 11 according to the embodiment uses a positive liquid crystal and employs a vertical electrical field ECB mode in which initial alignment of liquid crystal molecules is in a horizontal alignment state.

The liquid crystal layer 160 is composed of a liquid crystal material containing liquid crystal molecules 1601. By applying a voltage to the liquid crystal layer 160 and changing the alignment state of the liquid crystal molecules 1601 in accordance with the applied voltage, an amount of light transmission can be controlled. Note that a state in which the voltage applied to the liquid crystal layer 160 is less than a threshold value is referred to as a no voltage applied state.

The liquid crystal molecules 1601 may preferably have a positive value of anisotropy of dielectric constant (Δε) defined by the following equation.

$$\Delta\varepsilon = (\text{Dielectric constant in major axis direction}) - (\text{Dielectric constant in minor axis direction})$$

The liquid crystal molecules 1601 may have a negative value of anisotropy of dielectric constant (Δε). In the polarization module 11 according to the embodiment, liquid crystal molecules having a positive value of anisotropy of dielectric constant (Δε) are used. Note that the liquid crystal molecules having positive anisotropy of dielectric constant is also referred to as positive liquid crystal, and the liquid crystal molecules having negative anisotropy of dielectric constant is also referred to as negative liquid crystal. The major axis direction of the liquid crystal molecules is a direction of a slow axis.

The liquid crystal molecules 1601 also preferably satisfy Equation (1) below.

$$K11 \ge \gamma 1 / \{(\Delta\varepsilon)^2 \times 1.3 \times 10^{11}\} \qquad \text{Equation (1)}$$

(In the equation, K11 represents a splay elastic constant (pN) of the liquid crystal molecules 1601. γ1 represents a rotational viscosity coefficient (mPa·s) of the liquid crystal material. Δε represents anisotropy of dielectric constant of the liquid crystal molecules 1601)

That is, it is preferable to select, as the liquid crystal molecules 1601, liquid crystal molecules having anisotropy of dielectric constant Δε that satisfies the relationship in Equation (1). Thus, in particular, a response time from voltage on to voltage off can be shortened, and the polarization module 11 that can follow ultra-high-speed image switching can be obtained.

The anisotropy of dielectric constant $\Delta\varepsilon$ of the liquid crystal molecules 1601 may be within a range that satisfies Equation (1) above, and is preferably 0.1 or more from the viewpoint of further enabling high-speed response. More preferably, the anisotropy of dielectric constant $\Delta\varepsilon$ is 0.11 or more. From the viewpoint of cell thickness control in consideration of actual production, the anisotropy of dielectric constant $\Delta\varepsilon$ is preferably 0.22 or less. More preferably, the anisotropy of dielectric constant $\Delta\varepsilon$ is 0.2 or less.

The liquid crystal molecules 1601 preferably have a splay elastic constant K11 of 5 pN or more from the viewpoint of further enabling high-speed response. More preferably, the splay elastic constant K11 is 10 pN or more. From the same viewpoint, the splay elastic constant K11 is preferably 30 pN or less. More preferably, the splay elastic constant K11 is 20 pN or less. The most preferable range of the splay elastic constant K11 is from 10 to 20 pN.

From the viewpoint of further enabling high-speed response, the liquid crystal material constituting the liquid crystal layer 160 preferably has a rotational viscosity coefficient $\gamma 1$ of 100 mPa·s or less. More preferably, the rotational viscosity coefficient $\gamma 1$ is 60 mPa·s or less. From the same viewpoint, the rotational viscosity coefficient $\gamma 1$ is preferably 20 mPa·s or more. More preferably, the rotational viscosity coefficient $\gamma 1$ is 30 mPa·s or more. The most preferable range of the rotational viscosity coefficient $\gamma 1$ is from 30 to 60 mPa·s.

A thickness of the liquid crystal layer 160 (cell thickness) is preferably from 100 nm to 10 μm. More preferably, the cell thickness is from 500 nm to 5 μm, and still more preferably from 1 μm to 3 μm.

The alignment films 141 and 142 are placed on both sides (the observation face side and the back face side) of the liquid crystal layer 160, respectively. Further, an insulating film may be provided between the alignment film and the electrode. In the polarization module 11 according to the embodiment, the insulating film 131 and the alignment film 141 are provided between the first electrode 121 and the liquid crystal layer 160 in the order from the electrode side, and the insulating film 132 and the alignment film 142 are provided between the second electrode 122 and the liquid crystal layer 160 in the order from the electrode side.

The alignment films 141 and 142 have a function of controlling the alignment of the liquid crystal molecules contained in the liquid crystal layer 160. When the voltage applied to the liquid crystal layer 160 is less than the threshold voltage (including no voltage application), the alignment of the liquid crystal molecules in the liquid crystal layer 160 is controlled mainly by action of the alignment films. As materials for the alignment films 141 and 142, materials commonly used in the field of liquid crystal display panels can be used, such as polymers having polyimide in a main chain, polymers having polyamic acid in a main chain, and polymers having polysiloxane in a main chain.

The insulating films 131 and 132 are preferably inorganic insulating films, for example. Examples of the inorganic insulating film include inorganic films (relative dielectric constant $\varepsilon=5$ to 7) such as silicon nitride (SiNx) and silicon oxide ($SiO_2$), and a layered film thereof. A thickness of each insulating film is not limited, and is preferably, for example, from 10 nm to 500 nm. More preferably, the thickness of each insulating film is from 30 nm to 300 nm.

The retarder 120 to be combined with the optical layered body 110 may have an in-plane retardation Ro or a thickness direction retardation Rth. The retarder 120 is preferably a uniaxial retarder having an in-plane retardation Ro. An absolute value |Ro| of the in-plane retardation Ro is preferably 50 nm or more. More preferably, the absolute value |Ro| is 80 nm or more, and still more preferably 100 nm or more. The absolute value |Ro| is preferably 500 nm or less. More preferably, the absolute value |Ro| is 400 nm or less, and still more preferably 350 nm or less.

As the retarder 120, a $\lambda/4$ retarder (also referred to as a $\lambda/4$ plate) or a $\lambda/2$ retarder (also referred to as a $\lambda/2$ plate) is suitable. In the polarization module 11 according to the embodiment, a $\lambda/4$ plate is used as the retarder 120, as will be described later.

The retarder 120 may have a single layer structure or a layered structure of two or more layers. When combining the display panel 12 and the polarization module 11, the retarder 120 is preferably placed closer to the display panel 12.

A thickness of the retarder 120 is not limited, and is preferably, for example, from 10 μm to 500 μm. More preferably, the thickness is from 50 μm to 200 μm.

A material of the retarder 120 is not limited, and, for example, a drawn polymer film, a liquid crystal material with fixed alignment, a thin plate made of an inorganic material, or the like can be used. A method of forming the retarder 120 is not limited.

When the retarder 120 is formed from a polymer film, for example, the forming method may be a solvent casting method, a melt extrusion method, or the like. The method of forming the retarder 120 may be a co-extrusion method to simultaneously form multiple retarders 120. As long as a desired retardation is exhibited by the retarder 120, the retarder 120 may or may not be drawn. The drawing method is not limited, and examples thereof include an inter-roll pulling drawing method, an inter-roll compression drawing method, a tenter transverse uniaxial drawing method, an oblique drawing method, a longitudinal and lateral biaxial drawing method, and a special drawing method in which drawing is performed under action of shrinkage force of a heat-shrinkable film.

When the retarder 120 is formed from a liquid crystal material, examples of the formation method include a method of applying the liquid crystal material on a base film subjected to an alignment treatment and fixing the alignment. As long as a desired retardation is exhibited by the retarder 120, the formation method may be a method in which a substrate film is not subjected to a special alignment treatment, a method in which alignment is fixed and then the base film is peeled off and transferred to another film, or the like. Further, the retarder 120 may be formed by a method in which the alignment of the liquid crystal material is not fixed. When the retarder 120 is formed from a non-liquid crystal material, the formation method may be the same as when formed from a liquid crystal material.

As the retarder 120, a drawn film containing a material having positive intrinsic birefringence (intrinsic refractive index anisotropy) as a component or the like can be used as appropriate. Examples of the material having positive intrinsic birefringence include polycarbonate, polysulfone, polyethersulfone, polyethylene terephthalate, polyethylene, polyvinyl alcohol, norbornene, triacetylcellulose, diacetylcellulose, and a cycloolefin polymer.

A method of manufacturing the optical layered body 110 and a method of manufacturing the polarization module 11 using the optical layered body 110 and the retarder 120 are not limited, and methods commonly used in the field of liquid crystal panels can be used.

The AR panel drive unit 15 controls voltage application to the liquid crystal layer 160 under the control of the controller 20 to be described later. Thus, the polarization module 11 can be switched to multiple polarization states.

In the polarization module 11 according to the embodiment, the optical layered body 110 performs retardation switching between λ/2 and 0. In the polarization module 11 according to the embodiment, a λ/4 plate is used as the retarder 120, and the optical layered body 110 and the retarder 120 are arranged so that a slow axis of the optical layered body 110 and a slow axis of the retarder 120 are orthogonal to each other. Thus, the polarization module 11 according to the embodiment can perform retardation switching between +λ/4 and −λ/4.

In this case, one of the polarizing films having a −λ/4 retardation and a +λ/4 retardation is attached to the polarized glasses 200. As an example, assuming that the +λ/4 phase in the polarization module 11 is a first polarization state and the −λ/4 phase is a second polarization state, a polarizing film having a +λ/4 retardation is attached to the polarized glasses 200. Thus, when the polarization module 11 is in the first state (the retardation switching state is +λ/4), the retardation becomes +λ/2 (=(+)/4)+ (+)/4)), and the polarized glasses 200 transmit polarized light. When the polarization module 11 is in the second state (the retardation switching state is −λ/4), the retardation becomes 0 (=(−λ/4)+(+λ/4)), and the polarized glasses 200 do not transmit polarized light. When the first polarization state and the second polarization state of the polarization module 11 are reversed in the retardation switching between +λ/4 and −λ/4, a polarizing film having a −λ/4 retardation may be attached to the polarized glasses 200.

The controller 20 includes a timing controller 21, a memory 22, an image generation unit 23, and a data selector 25. The memory 22 includes a storage area 221 for storing first image data D1 input as an image signal Sg1 from the outside.

The image generation unit 23 generates second image data D2 from the first image data D1 stored in the memory 22. In order to generate the second image data D2 from the first image data D1, the image generation unit 23 uses a lookup table (LUT) 24 described later. The image generation unit 23 may be configured of an electric circuit or may be achieved by software control.

Generating the second image data D2 from the first image data D1 in the image generation unit 23 is generating the second image data D2, which is an image that is combined with the first image to make the first image imperceptible, by converting at least part of the first image data D1. Preferably, the second image data D2 may be an image that, when combined with the first image, renders the first image imperceptible in a state in which responsiveness of the display panel 12 is affected by luminance. In other words, the second image data D2 is an image that is combined with the first image displayed on the display panel 12 and visually recognized by the viewer A, so that the viewer A does not perceive the first image. The image generation unit 23 converts pixel values of predefined pixels among the pixels indicated in the first image data D1 in accordance with a predefined relationship. The predefined pixels are, for example, all pixels of the first image. The second image is, as an example, an image in which all pixels have a specific pixel value (e.g., a gray image) by being combined with the first image.

Figure 5:
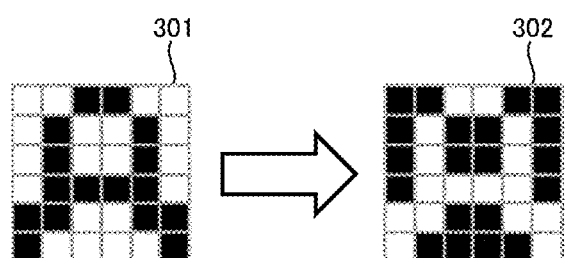
FIG. 5 is a diagram illustrating an example of a first image and a second image.

FIG. 5 is a diagram illustrating an example of a first image 301 and a second image 302. The first image 301 in FIG. 5 is a 6×6 dot image in which "A" is represented by black pixels and the other pixels are white pixels. As an example, the image generation unit 23 inverts the black and white of the first image data D1 for the first image 301 to generate the second image data D2. In the case of the example in FIG. 5, the second image 302 is a 6×6 dot image in which "A" is represented by white pixels and the other pixels are black pixels.

The first image 301 and the second image 302 illustrated in FIG. 5 are alternately illuminated from the display panel 12 in a time division manner, so that when the viewer A is not wearing the polarized glasses 200, a composite image of the first image 301 and the second image 302 (gray image) is perceived, and only the first image 301 is not visually recognized. When the viewer A is wearing the polarized glasses 200, the second image 302 is not visually recognized, so only the first image 301 is visually recognized. Thus, the first image 301 can be perceived only when wearing the polarized glasses 200, or only by a user wearing the polarized glasses 200.

The LUT 24 defines corresponding relationship between the pixel values of the first image data D1 and the second image data D2. The image generation unit 23 generates the second image data D2 by converting the pixel values of pixels of the first image data D1 into pixel values defined in the LUT 24. Preferably, the corresponding relationship of pixel values between the first image data D1 and the second image data D2 is determined by measuring combination of the gray scales of the first image data D1 and the second image data D2 displayed with the display settings of the display panel 12, such as responsiveness of the display panel 12, responsiveness of the polarization module 11, and overdrive and gamma value as the same settings as the display device 10, using a luminance meter so that the integrated luminance for each combination is constant. As another example, the corresponding relationship of pixel values between the first image data D1 and the second image data D2 may be defined by a function or an arithmetic equation. As another example, the corresponding relationship of pixel values between the first image data D1 and the second image data D2 may be machine learned by deep learning or the like, so that the image generation unit 23 uses the first image data D1 as input values and outputs the second image data D2.

FIG. 6 is a diagram illustrating an example of the LUT 24. The LUT 24 defines a pixel value 242 of the second image data D2 corresponding to a pixel value 241 of the first image data D1. To be specific, pixel values 255, . . . X, Y, . . . 0 of the second image data D2 are defined for pixel values 0, . . . 127, 128, . . . 255 of the first image data D1, respectively.

The timing controller 21 inputs a synchronization signal Sg2 to the memory 22, the data selector 25, the AR panel drive unit 15, and the BL drive unit 17 at a predefined timing. The predefined timing is, as an example, every frame of the first image data D1 contained in the signal Sg1.

The data selector 25 obtains the first image data D1 stored in the memory 22 and the second image data D2 generated in the image generation unit 23. The data selector 25 alternately outputs the first image data D1 and the second image data D2 to the display panel drive unit 16 at the timing according to the synchronization signal Sg2. Thus, the first image based on the first image data D1 and the second image based on the second image data D2 are alternately displayed on the display panel 12 in a time division manner at the timing based on the synchronization signal Sg2. The timing based on the synchronization signal Sg2 is, as an example, every frame. The display switching between the first image and the second image is not limited to every frame and may be switched at such a speed that the first image and the second image are not perceived individually when the viewer A is not wearing the polarized glasses 200 and does not perceive any flicker. The display switching between the first image and the second image is preferably performed at 180 Hz or more.

Figure 7:
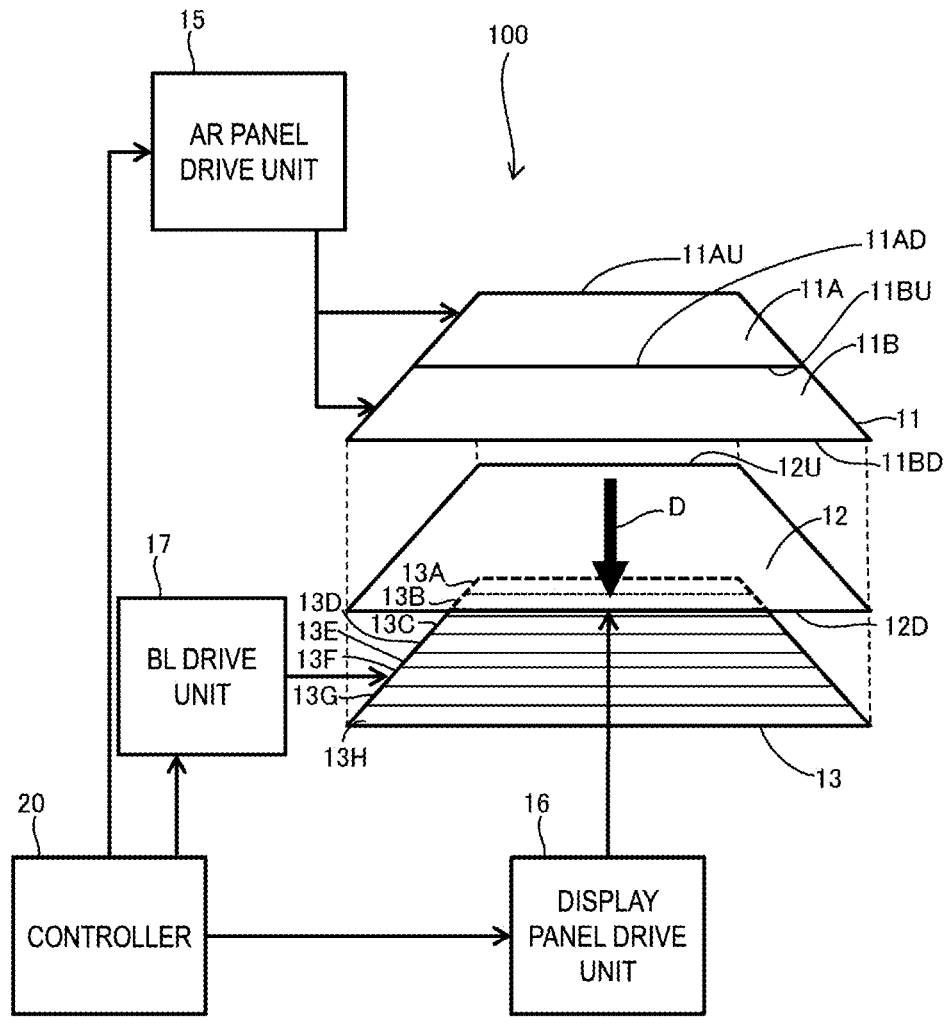
FIG. 7 is a schematic diagram illustrating a partial configuration of the display system.

FIG. 7 is a schematic diagram illustrating a partial configuration of the display system 100. By sequentially applying voltages based on image data to pixels by the display panel drive unit 16, images are sequentially written on the display panel 12 in a direction D. The direction D represents a scanning direction of the display panel 12, and the direction D is a direction from an upper end 12U to a lower end 12D of the display panel 12. That is, images are sequentially written to the display panel 12 from the upper end 12U to the lower end 12D.

The AR panel drive unit 15 switches the polarization state of the polarization module 11 alternately between the first polarization state and the second polarization state in synchronization with switching between the first image and the second image on the display panel 12 at a timing based on the synchronization signal Sg2. As an example, the AR panel drive unit 15 switches the polarization state of the polarization module 11 between the first polarization state and the second polarization state every frame. That is, the polarization module 11 switches to the first polarization state at the timing when the first image is displayed on the display panel 12, and the polarization module 11 switches to the second polarization state at the timing when the second image is displayed on the display panel 12.

The polarization module 11 is divided into multiple segments in the direction D. In the example in FIG. 7, the polarization module 11 is divided into an upper segment 11A and a lower segment 11B. An upper end 11AU of the upper segment 11A coincides with the upper end 12U of the display panel 12, and a lower end 11BD of the lower segment 11B coincides with the lower end 12D of the display panel 12. A lower end 11AD of the upper segment 11A and an upper end 11BU of the lower segment 11B coincide with each other, and they coincide with the center of the display panel 12. The AR panel drive unit 15 independently controls the polarization states of the upper segment 11A and the lower segment 11B.

The BL drive unit 17 controls turning on and off of the backlight 13 at a timing based on the synchronization signal Sg2. That is, the BL drive unit 17 controls turning on and off of the backlight 13 in synchronization with the switching between the first image and the second image on the display panel 12.

In detail, the BL drive unit 17 turns off the backlight 13 during non-lighting periods defined within the display periods of a first display period during which the first image is displayed on the display panel 12 and a second display period during which the second image is displayed on the display panel 12. The BL drive unit 17 turns on the backlight 13 during lighting periods, which are periods other than the non-lighting periods in the first display period and the second display period.

Brightness (luminance) at which the viewer A visually recognizes each pixel on the display panel 12 is an amount of light that the viewer A receives from each pixel during the lighting period of the backlight 13. Therefore, the brightness at which the viewer A visually recognizes each pixel on the display panel 12 is an integrated value of the luminance change of each pixel during the lighting period of the backlight 13. The integrated value of the luminance during the lighting period of the backlight 13 at a pixel is also referred to as "integrated luminance" in distinction from instantaneous luminance in this pixel. The luminance of each pixel that the viewer A visually recognizes when not wearing the polarized glasses 200 by illuminating the first image and the second image alternately from the display panel 12 in a time division manner is the integrated luminance of each pixel in the first image and the second image during the lighting periods of the backlight 13.

Figure 8:
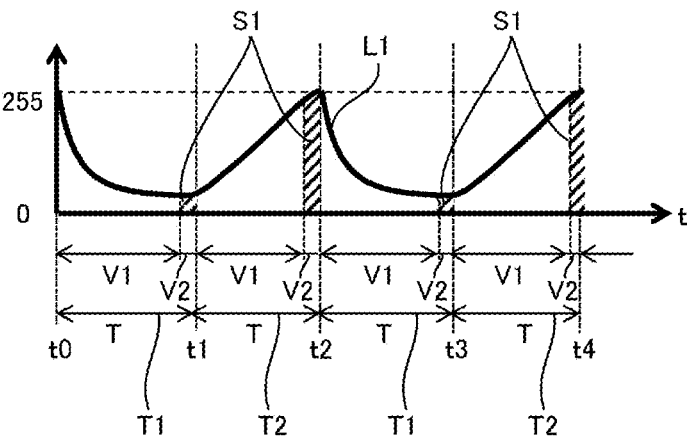
FIG. 8 is a diagram for explaining luminance visually recognized by a viewer when not wearing polarized glasses.
Figure 9:
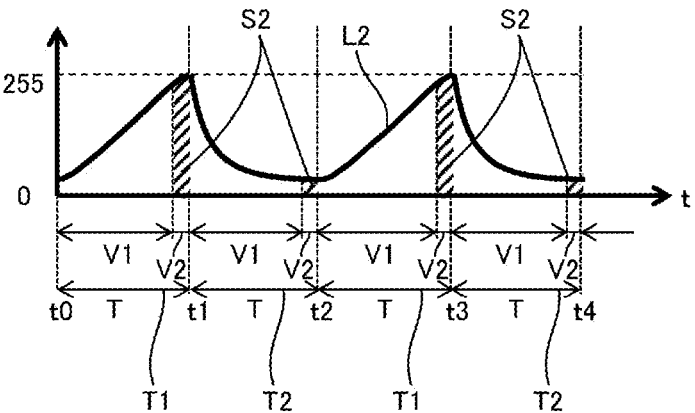
FIG. 9 is a diagram for explaining luminance visually recognized by a viewer when not wearing polarized glasses.

FIGS. 8 and 9 are diagrams for explaining the luminance visually recognized by the viewer A when not wearing the polarized glasses 200. In FIGS. 8 and 9, a horizontal axis represents passage of time. A vertical axis represents the luminance of the display panel 12 as a gray scale value. In FIGS. 8 and 9, the second image data D2 has a corresponding relationship, defined in the LUT 24 in FIG. 6, with the first image data D1. That is, the pixel value of the second image corresponding to the first image having a gray scale of 0 as a pixel value has a gray scale of 255 as a pixel value, and the second image corresponding to the first image having a gray scale of 255 as a pixel value has a gray scale of 0 as a pixel value.

In FIGS. 8 and 9, time t0 to t1, time t1 to t2, time t2 to t3, and time t3 to t4 are all one frame time T. The first image is displayed on the display panel 12 from time t0 to time t1 and from time t2 to time t3, and these times are defined as a first image period T1. The second image is displayed on the display panel 12 from time t1 to time t2 and from time t3 to time t4, and these times are defined as a second image period T2. The polarization state of the polarization module 11 is switched from the second polarization state to the first polarization state at times t0 and t2, and is switched from the first polarization state to the second polarization state at times t1 and t3. Note that in FIGS. 8 and 9, the response of the polarization module 11 is assumed to be sufficiently fast.

Here, attention is paid to a pixel having a gray scale of 0 as a pixel value in the first image and a pixel having a gray scale of 255 as a pixel value in the first image. The former pixel is referred to as a first target pixel, and the latter pixel is referred to as a second target pixel. The first target pixel has a gray scale of 255 as a pixel value in the second image, and the second target pixel has a gray scale of 0 as a pixel value in the second image. A curve L1 in FIG. 8 represents a change in the instantaneous luminance of the first target pixel. A curve L2 in FIG. 9 represents a change in the instantaneous luminance of the second target pixel.

Referring to FIG. 8, when the display switches to the first image at time t0, the luminance of the first target pixel changes from the gray scale value before switching (a gray scale of 255) to a gray scale of 0. When the target pixel has a gray scale of 0, it indicates that irradiation light from the backlight 13 is blocked. When the display switches from the first image to the second image at time t1, the luminance of the first target pixel changes from a gray scale of 0 to a gray scale of 255 of the second image. When the target pixel has a gray scale of 255, it indicates that irradiation light from the backlight 13 is transmitted.

Referring to FIG. 9, when the display switches to the first image at time t0, the luminance of the second target pixel changes from the gray scale value before switching (a gray scale of 0) to a gray scale of 255. When the display switches from the first image to the second image at time t1, the luminance of the second target pixel changes from a gray scale of 255 to a gray scale of 0 of the first image.

When the display panel 12 is a liquid crystal display, a time lag occurs from a start of display switching until the gray scale of the target pixel reaches the gray scale after switching or until the gray scale stabilizes at a gray scale close to the gray scale after switching. The time lag is caused by responsiveness of the display panel 12 and the like. For example, the gray scale of the first target pixel indicated by the curve L1 (FIG. 8) gradually decreases from a gray scale of 255 in the first image period T1 after the display is switched at time t0, and stabilizes at a gray scale close to a gray scale of 0. During the period until reaching the gray scale close to a gray scale of 0, the pixel value of the first target pixel changes at a gray scale greater than a gray scale of 0. When the display is switched at time t1, the gray scale gradually increases in the second image period T2 and stabilizes at a gray scale close to a gray scale of 255. During the period until reaching the gray scale close to a gray scale of 255, the pixel value of the first target pixel changes at a gray scale less than a gray scale of 255. Thus, immediately after switching the image displayed on the display panel 12, the luminance of the display panel 12 may be difficult to stabilize.

When the luminance of the backlight 13 during a lighting period V2 is constant, the luminance that the viewer A visually recognizes when not wearing the polarized glasses 200 for the first target pixel is an integrated value of the curve L1 during the lighting period V2. The integrated value of the curve L1 during the lighting period V2 is a hatched area S1 in FIG. 8. The luminance that the viewer A visually recognizes when not wearing the polarized glasses 200 for the second target pixel is an integrated value of the curve L2 during the lighting period V2. The integrated value of the curve L2 during the lighting period V2 is a hatched area S2 in FIG. 9.

For the first target pixel, when the luminance of the first target pixel in the second image is a gray scale of 255, the luminance that the viewer A visually recognizes when not wearing the polarized glasses 200 is the maximum. For the second target pixel, when the luminance of the second target pixel in the second image is a gray scale of 0, the luminance that the viewer A visually recognizes when not wearing the polarized glasses 200 is the minimum.

Since the pixel values of the first image data D1 and the second image data D2 for each pixel have the corresponding relationship defined in the LUT 24 in FIG. 6, the area S1 in FIG. 8 is equal to the area S2 in FIG. 9. Therefore, the maximum luminance of the first target pixel and the minimum luminance of the second target pixel that can be visually recognized by the viewer A when not wearing the polarized glasses 200 are equal. That is, since the LUT 24 defines the pixel value of the second image data D2 relative to the pixel value of the first image data D1 so that the integrated luminance values are equal, an entire image can be visually recognized at a specific integrated luminance when the viewer A is not wearing the polarized glasses 200.

What defines the relationship between the pixel values of the first image data D1 and the pixel values of the second image data D2 is not limited to the table format as shown in FIG. 6. As another example, an arithmetic equation may be used in which the pixel value of the second image data D2 is obtained by substituting the pixel value of the first image data D1. The LUT 24 may define a relationship between the pixel values of the first image data D1 and the second image data D2 for each of R, G, and B pixels, or may define a relationship between the pixel values of the first image data D1 and the second image data D2 in common for the R, G, and B pixels.

The LUT 24 does not need to define the correspondence of pixel values of the second image data D2 for all pixel values of the first image data D1, but only needs to define for at least some of the pixel values. For example, the LUT 24 may define the correspondence of the second image data D2 for multiple pixel values that are less than all of the first image data D1, and other pixel values may be obtained by linear interpolation or the like. Furthermore, the LUT 24 may be prepared for each temperature, and the LUT 24 corresponding to the temperature on the display panel 12 may be used. Alternatively, LUTs 24 for multiple specific temperatures may be prepared and used by linear interpolation corresponding to the temperature on the display panel 12.

A light-emitting face of the backlight 13 is divided into multiple segments in the direction D (FIG. 7). The BL drive unit 17 independently controls turning on/off of the segments of the backlight 13. In the example in FIG. 7, the backlight 13 is divided into eight groups from a first segment 13A to an eighth segment 13H. The first segment 13A is closest to the upper end 12U of the display panel 12, and the eighth segment 13H is closest to the lower end 12D of the display panel 12. The first segment 13A to the fourth segment 13D overlap the upper segment 11A of the polarization module 11 in a plan view, and the fifth segment 13E to the eighth segment 13H overlap the lower segment 11B of the polarization module 11 in a plan view.

Figure 10:
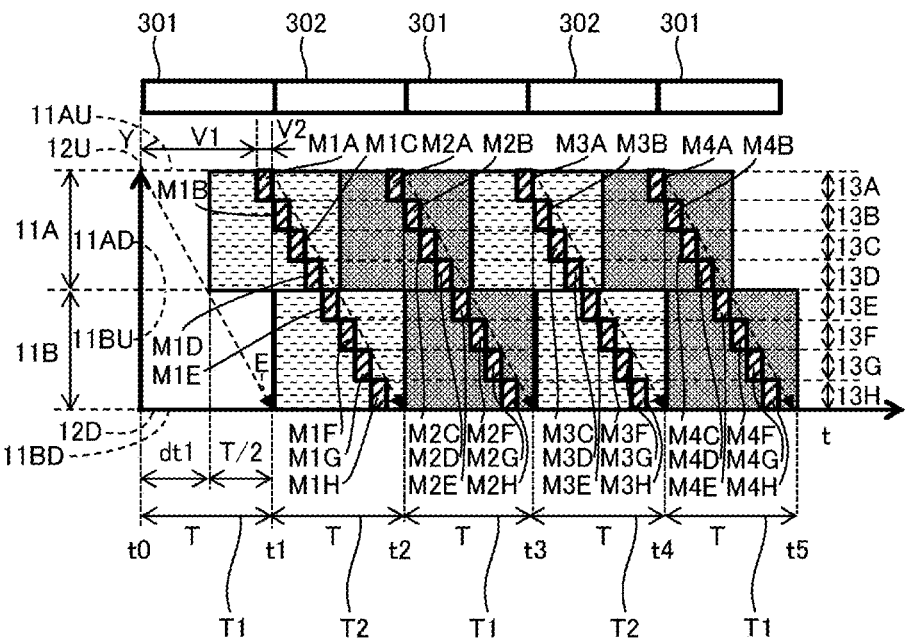
FIG. 10 is a schematic diagram for explaining a relationship between a display of a display panel, a polarization state of the polarization module, and a lighting state of a backlight in the display system according to the first embodiment.

FIG. 10 is a schematic diagram for explaining a relationship between a display on the display panel 12, a polarization state of the polarization module 11, and a lighting state of the backlight 13 in the display system 100. A horizontal axis in FIG. 10 represents passage of time. A vertical axis (Y-axis) in FIG. 10 represents positions of the polarization module 11, the display panel 12, and the backlight 13 in the direction D. The zero position (Y=0) on the vertical axis Y is defined as the lower end 12D of the display panel 12 and the lower end 11BD of the lower segment 11B. A negative direction of the Y axis coincides with the direction D.

An image is written on the display panel 12 by sequentially applying voltages based on the image data to the display panel 12 from the upper end 12U to the lower end 12D in one frame time T by the display panel drive unit 16. A writing direction E indicated by an arrow in FIG. 10 indicates a writing position and a timing in the display panel 12. Writing of the first image 301 is started from the upper end 12U of the display panel 12 at times to and t2, and writing is completed up to the lower end 12D of the display panel 12 at times t1 and t3 after time T. Writing of the second image 302 is started from the upper end 12U of the display panel 12 at times t1 and t3, and writing is completed up to the lower end 12D of the display panel 12 at times t2 and t4 after time T. Therefore, at times to and t2 when writing of the first image 301 is started, the first image 301 is not displayed below the upper end 12U of the display panel 12, and the second image 302 before switching is displayed. At times t1 and t3 when writing of the second image 302 is started, the second image 302 is not displayed below the upper end 12U of the display panel 12, and the first image 301 before switching is displayed.

The AR panel drive unit 15 switches the polarization state of the upper segment 11A and the polarization state of the lower segment 11B by sequentially shifting them in the direction D based on the synchronization signal Sg2 from the timing controller 21. In this example, the AR panel drive unit 15 switches the polarization state by shifting the lower segment 11B from the upper segment 11A by half the frame (T/2).

To be specific, the AR panel drive unit 15 switches the polarization state of the upper segment 11A after a time difference dt1 (dt1<T) from the start of writing an image onto the display panel 12. Thereafter, the AR panel drive unit 15 switches the lower segment 11B to the first polarization state by shifting by half the frame (T/2). In the example in FIG. 10, as an example, the time difference dt1 is assumed to be a period of half the frame (T/2) (dt1=T/2).

The BL drive unit 17 sequentially turns on the first segment 13A to the eighth segment 13H of the backlight 13 one by one in turn along the direction D based on the synchronization signal Sg2 from the timing controller 21. In this example, the BL drive unit 17 turns off each of the first segment 13A to the eighth segment 13H during the non-lighting period V1 from the start of writing at the corresponding position on the display panel 12, and then turns on each of them. The position on the display panel 12 corresponding to each segment of the backlight 13 corresponds to an area on the screen of the display panel 12 where each segment of the backlight 13 overlaps in a plan view.

To be specific, the BL drive unit 17 turns off the first segment 13A for a predetermined period (non-lighting period V1) from time t0 during the period from writing start time t0 of the first image 301 to writing start time t1 of the second image 302 (first image period T1, which corresponds to one frame length T) and turns on the first segment 13A only for the lighting period V2 after the non-lighting period V1 has elapsed. The same applies to the subsequent segments 13B to 13H. That is, during a period from the writing start time of the first image 301 to the writing start time of the second image 302 (a period corresponding to one frame length T) at each corresponding position on the display panel 12 in the direction D, the BL drive unit 17 turns off the segment corresponding to each position for a first predetermined period (a period having the same length as the non-lighting period V1) and then turns on this segment. In FIG. 10, the lighting periods of the segments 13A to 13H when the first image 301 is written sequentially in the direction D from start time t0 are represented by hatched portions M1A to M1H, respectively. As illustrated in FIG. 10, the segments 13A to 13H of the backlight 13 are sequentially turned on for a predetermined period (a period of the same length as the lighting period V2 of the first segment 13A) in the direction D and turned off during other periods.

The non-lighting period at each position on the display panel 12 in the direction D corresponding to each of the segments 13A to 13H (e.g., the period V1 for the first segment 13A) starts, as an example, from the time when writing an image to an area of the display panel 12 where each segment overlaps in a plan view (e.g., time t0 for the first segment 13A) and is shorter than the first image period T1. The non-lighting period is a period required for the pixel value of each pixel to reach the gray scale after switching, or a period until the pixel value is stabilized at a gray scale close to the gray scale after switching, that is, a period corresponding to the time lag described above. As an example, a length of the non-lighting period may be determined in accordance with characteristics such as responsiveness of the display panel 12 or may be determined in accordance with results of measuring luminance under specific conditions.

For the period from writing start time t1 of the second image 302 to writing start time t2 of the first image 301 (the period corresponding to one frame length T), the period from writing start time t2 of the first image 301 to writing start time t3 of the second image 302, and the period from writing start time t3 of the second image 302 to writing start time t4 of the first image 301, the BL drive unit 17 turns off each of the segments 13A to 13H for a predetermined period (the period corresponding to the length of the non-lighting period V1) after the start of writing an image to the area corresponding to each segment of the backlight 13 at the corresponding position on the display panel 12, and then turns on each segment for the period corresponding to the lighting period V2. In FIG. 10, the lighting periods of the segments 13A to 13H when the second image 302 is sequentially written from start time t1 are represented by hatched portions M2A to M2H, respectively, the lighting periods of the segments 13A to 13H when the first image 301 is sequentially written from start time t2 are represented by hatched portions M3A to M3H, respectively, and the lighting periods of the segments 13A to 13H when the second image 302 is sequentially written from start time t3 are represented by hatched portions M4A to M4H, respectively.

The lighting periods M1A to M1H, M2A to M2H, M3A to M3H, M4A to M4H of the respective segments 13A to 13H are included, at the corresponding positions on the display panel 12, in a period during which the first image 301 is written and the polarization module 11 is in the first polarization state, or a period during which the second image 302 is written and the polarization module 11 is in the second polarization state. Thus, the first image 301 or the second image 302 is illuminated with stable luminance at each position on the display panel 12 in the direction D.

Figure 11:
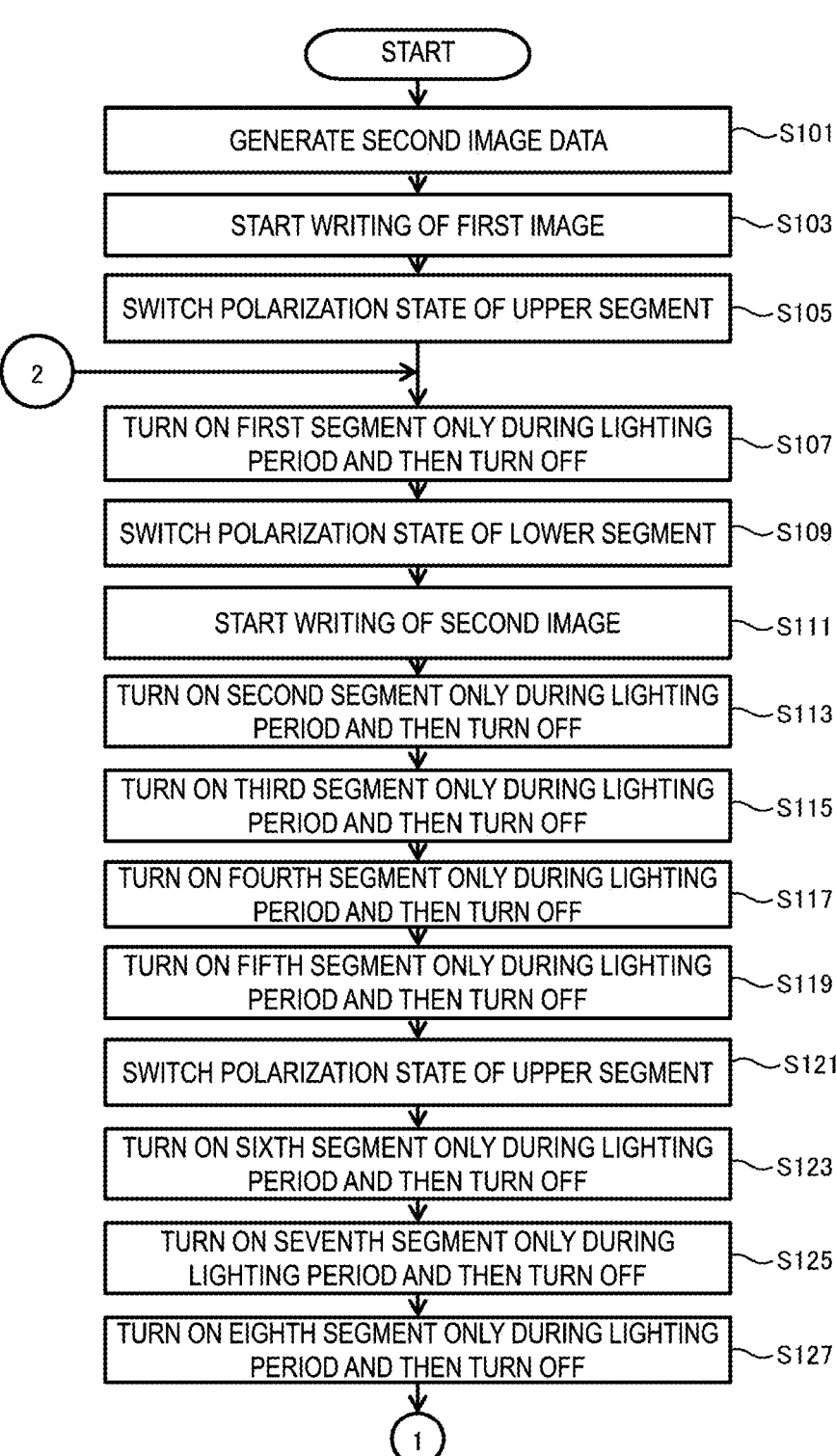
FIG. 11 is a flowchart illustrating an example of a method of controlling the display device in the display system.
Figure 12:
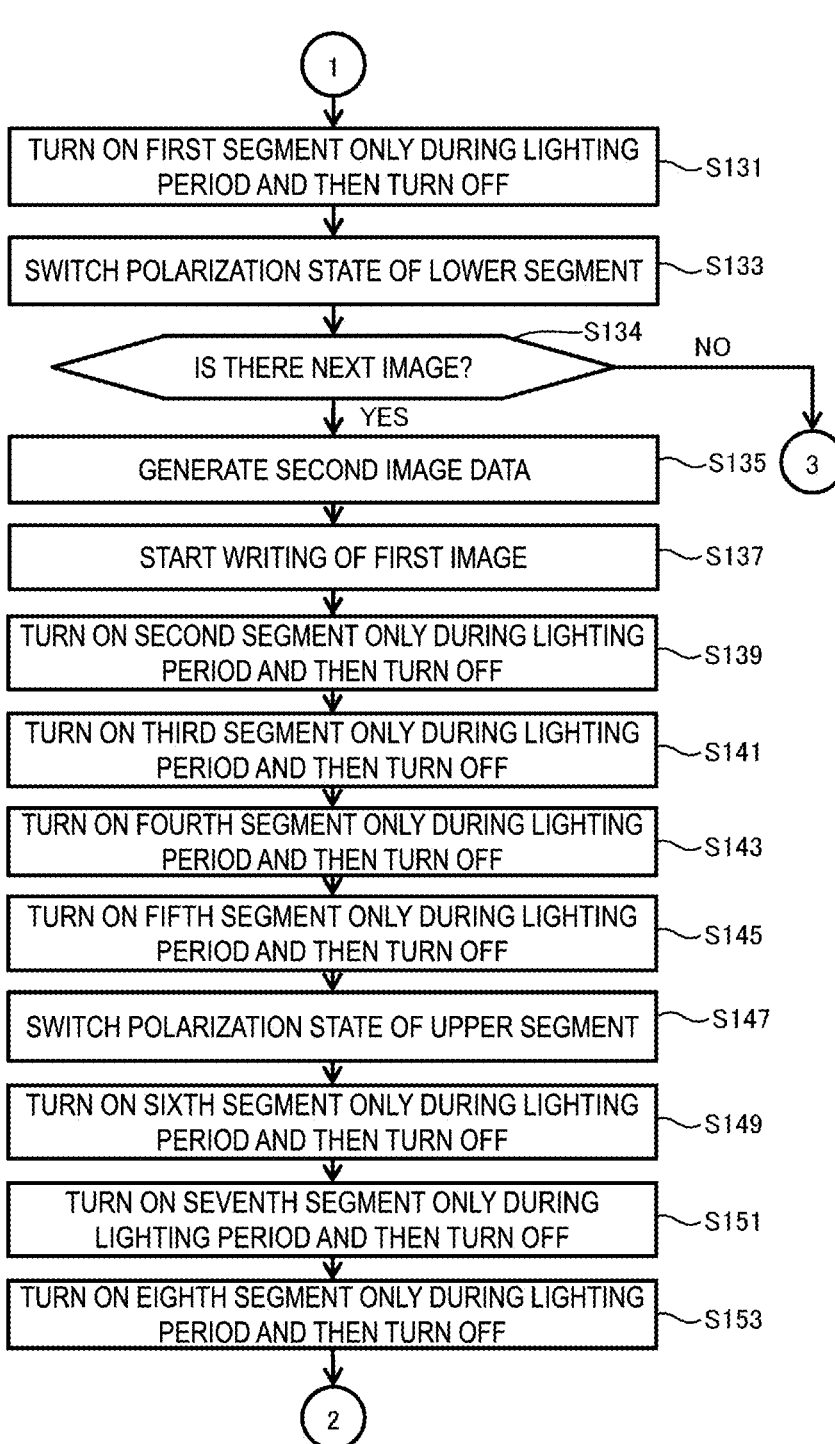
FIG. 12 is a flowchart illustrating an example of a method of controlling the display device in the display system.
Figure 13:
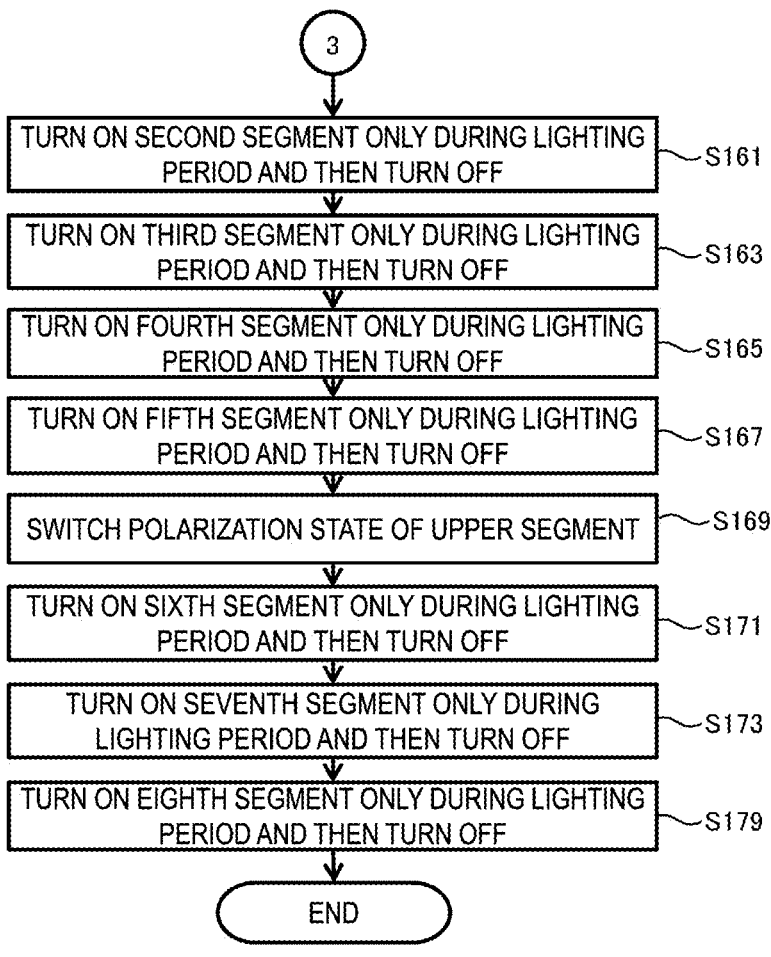
FIG. 13 is a flowchart illustrating an example of a method of controlling the display device in the display system.

FIGS. 11 to 13 are flowcharts illustrating an example of a method of controlling the display device 10 in the display system 100. The memory 22 stores the image data D1 input from the outside as the image signal Sg1. The control illustrated in FIGS. 11 to 13 is started, as an example, when display of the first image data D1 is instructed by an input device (not illustrated) or the like. As an example, the display instruction may include designation of whether the first image data D1 is to be displayed as a secret image or as a normal display. As another example, the first image data D1 may contain information that the image is a secret image, and the control illustrated in FIGS. 11 to 13 may be performed in the display system 100 by reading the information that the image is a secret image from the first image data D1.

The image generation unit 23 generates the second image data D2 from the first image data D1 stored in the memory 22 (step S101) and inputs the second image data D2 to the data selector 25. The timing controller 21 outputs the synchronization signal Sg2 for each frame of the first image data D1 contained in the signal Sg1.

At the timing indicated by the synchronization signal Sg2, the data selector 25 outputs a control signal to the display panel drive unit 16 to display the first image from the first image data D1 stored in the memory 22 on the display panel 12, thereby starting to write the first image on the display panel 12 (step S103). The AR panel drive unit 15 switches the upper segment 11A of the polarization module 11 to the first polarization state based on the timing indicated by the synchronization signal Sg2 (step S105). According to the example in FIG. 10, in step S105, the AR panel drive unit 15 switches the upper segment 11A to the first polarization state after the time difference dt from the start of writing the first image on the display panel 12.

After a predetermined non-lighting period has elapsed since writing of the first image was started at the corresponding positions on the display panel 12, the BL drive unit 17 sequentially turns on the segments 13A to 13H of the backlight 13 for the lighting period and then turns them off.

That is, after the non-lighting period V1 has elapsed since writing of the first image was started at the corresponding position on the display panel 12, the BL drive unit 17 turns on the first segment 13A for the lighting period V2 and then turns it off (step S107).

In the example in FIG. 10, the timing at which the first segment 13A is turned off is when the time (dt+T/2) has elapsed since writing of the first image on the display panel 12 was started, so the AR panel drive unit 15 switches the lower segment 11B to the first polarization state at this timing (step S109). In the example in FIG. 10, at the timing when the first segment 13A is turned off (time t1), one frame period has elapsed since writing of the first image on the display panel 12 was started. Therefore, the data selector 25 outputs a control signal to the display panel drive unit 16 to display the second image from the second image data D2 on the display panel 12 based on the synchronization signal Sg2. Thus, writing of the second image onto the display panel 12 is started (step S111). That is, in the area illuminated by the first segment 13A of the backlight 13, the second image is written instead of the first image after the first segment 13A finishes lighting. The same applies to the second segment 13B to the eighth segment 13H.

Subsequently, after the non-lighting period (a period corresponding to the length of V1. The same applies hereinafter) has elapsed since writing of the first image was started at the corresponding position on the display panel 12, the BL drive unit 17 turns on the second segment 13B for the lighting period M1B and then turns it off (step S113). After the non-lighting period has elapsed since writing of the first image was started at the corresponding positions on the display panel 12, the BL drive unit 17 sequentially turns on the third segment 13C to the fifth segment 13E for the lighting periods MIC, MID, and MIE, respectively, and then turns them off (steps S115, 117, and 119).

In the example in FIG. 10, one frame period has elapsed since the upper segment 11A of the polarization module 11 was switched to the first polarization state at the timing when the fifth segment 13E was turned off. Therefore, the AR panel drive unit 15 switches the upper segment 11A to the second polarization state (step S121).

Subsequently, after the non-lighting period has elapsed since writing of the first image was started at the corresponding positions on the display panel 12, the BL drive unit 17 sequentially turns on the sixth segment 13F to the eighth segment 13H for the lighting periods M1F, M1G, and M1H, respectively, and then turns them off (steps S123, 125, and 127). After the non-lighting period has elapsed since writing of the second image was started at the corresponding position on the display panel 12, the BL drive unit 17 turns on the first segment 13A for the lighting period M2A and then turns it off (step S131).

In the example in FIG. 10, the timing at which the first segment 13A is turned off is when the time (dt+T/2) has elapsed since writing of the second image on the display panel 12 was started, so the AR panel drive unit 15 switches the lower segment 11B to the second polarization state (step S133). If displaying the next image (YES in step S134), the image generation unit 23 generates the second image data D2 from the first image data D1 stored in the memory 22 (step S135) and inputs the second image data D2 to the data selector 25. The timing controller 21 outputs the synchronization signal Sg2 based on the first image data D1 contained in the signal Sg1. At the timing indicated by the synchronization signal Sg2, the data selector 25 outputs a control signal to the display panel drive unit 16 to display the first image from the first image data D1 stored in the memory 22 on the display panel 12, thereby starting to write the first image on the display panel 12 (step S137).

Subsequently, after the non-lighting period has elapsed since writing of the second image was started at the corresponding positions on the display panel 12, the BL drive unit 17 sequentially turns on the second segment 13B to the fifth segment 13E for the lighting periods M2B, M2C, M2D, and M2E, respectively, and then turns them off (steps S139, 141, 143, and 145).

In the example in FIG. 10, one frame period has elapsed since the upper segment 11A of the polarization module 11 was switched to the second polarization state at the timing when the fifth segment 13E was turned off. Therefore, the AR panel drive unit 15 switches the upper segment 11A to the first polarization state (step S147).

Subsequently, after the non-lighting period has elapsed since writing of the second image was started at the corresponding positions on the display panel 12, the BL drive unit 17 sequentially turns on the sixth segment 13F to the eighth segment 13H for the lighting periods M2F, M2G, and M2H, respectively, and then turns them off (steps S149, 151, and 153). Thereafter, the processes from step S107 are repeated.

If there is no next image to display (NO in step S143), subsequently, after the non-lighting period has elapsed since writing of the second image was started at the corresponding positions on the display panel 12, the BL drive unit 17 sequentially turns on the second segment 13B to the eighth segment 13H for the lighting periods M2B, M2C, M2D, M2E, M2F, M2G and M2H, respectively, and then turns them off (steps S161, 163, 165, 167, 171, 173, and 179). These processes are the same as those in steps S139, 141, 143, 145, 149, 151, and 153 above, respectively. At this time, the AR panel drive unit 15 may switch the polarization state of the upper segment 11A at an appropriate timing (e.g., a timing at which the fifth segment 13E is turned off) (step S169) or may not switch the polarization state of the upper segment 11A. In the example in FIG. 10, the AR panel drive unit 15 switches the polarization state of the upper segment 11A at the timing when the fifth segment 13E is turned off.

Figure 14:
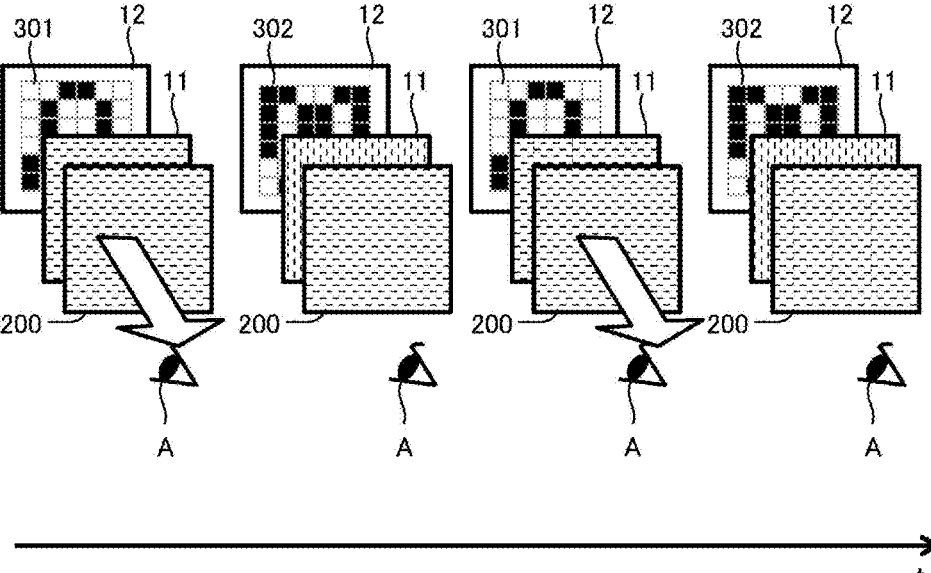
FIG. 14 is a schematic diagram illustrating an example of a display of the display panel, a polarization state of the polarization module, and an image perceived by a viewer.
Figure 14:
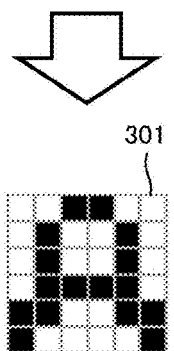
Figure 15:
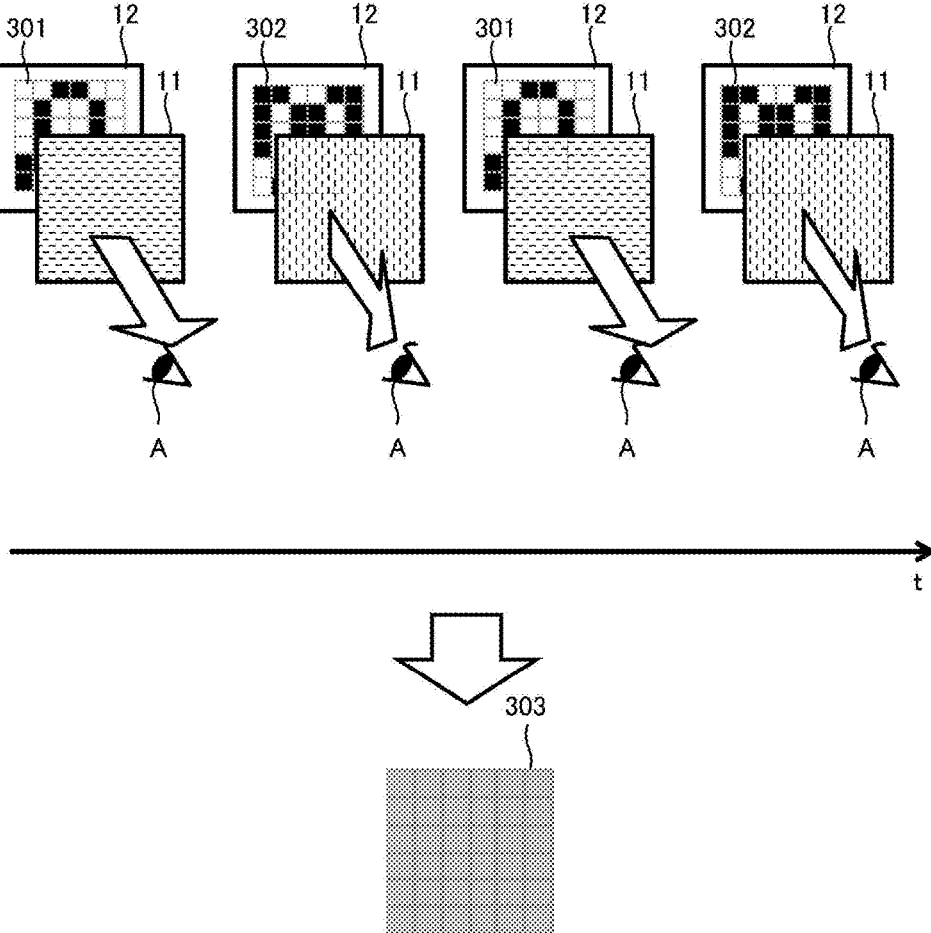
FIG. 15 is a schematic diagram illustrating an example of a display of the display panel, a polarization state of the polarization module, and an image perceived by a viewer.

FIGS. 14 and 15 are schematic diagrams illustrating examples of a display of the display panel 12 and a polarization state of the polarization module 11, and an image visually recognized by the viewer A. FIG. 14 illustrates an image perceived by the viewer A when wearing the polarized glasses 200. FIG. 15 illustrates an image perceived by the viewer A when not wearing the polarized glasses 200.

In FIGS. 14 and 15, a horizontal axis represents passage of time. The first image 301 and the second image 302 are alternately displayed on the display panel 12. When the first image 301 is displayed, the polarization module 11 is switched to the first polarization state, and when the second image 302 is displayed, the polarization module 11 is switched to the second polarization state.

When the viewer A is wearing the polarized glasses 200 (FIG. 14), the first image 301 passes through the polarized glasses 200 during the lighting period and is visually recognized by the viewer A. The second image 302 does not pass through the polarized glasses 200 and is not visually recognized by the viewer A. Therefore, when the viewer A is wearing the polarized glasses 200, only the first image 301 is visually recognized during the lighting period, and nothing is visually recognized when the second image 302 is displayed. As a result, only the first image 301 is visually recognized by the viewer A wearing the polarized glasses 200.

When the viewer A is not wearing the polarized glasses 200 (FIG. 15), both the first image 301 and the second image 302 are visually recognized by the viewer A during the lighting periods. Therefore, when the viewer A is not wearing the polarized glasses 200, the first image 301 and the second image 302 are switched frame by frame and are visually recognized during the lighting periods of the respective frames. As a result, the viewer A who is not wearing the polarized glasses 200 perceives a third image 303 that is a composite of the first image 301 and the second image 302. The integrated luminance values when the first image 301 and the second image 302 are displayed are equal for all pixels. Therefore, the third image 303 is an image having a uniform gray scale as a whole, such as a gray image.

By using the display system 100 according to the embodiment, the viewer A can perceive the first image only when wearing the polarized glasses 200. When not wearing the polarized glasses 200, the viewer A also visually recognizes an image (second image) different from the first image, and thus cannot perceive the first image. Thus, the first image can be perceived only by a specific user who can wear the polarized glasses 200. Alternatively, the first image can be perceived only at specific timing when the polarized glasses 200 can be worn. For example, by making confidential information or private information the first image, confidentiality of the information can be ensured. Thus, in the display system 100 according to the present embodiment, the confidentiality of a specific image can be ensured only by the presence or absence of polarized glasses 200 without impairing ease-of-use for users.

In addition, by using the display system 100 according to the embodiment, an image is not illuminated during a period when the luminance on the display panel 12 is changing, and an image is illuminated during a period when the luminance is stable. Therefore, the luminance of the image illuminated from the display panel 12 is stabilized. When the viewer A is wearing the polarized glasses 200, only the first image is illuminated to the viewer A. At this time, the first image with stable luminance is illuminated from the display panel 12, so that when the viewer A is wearing the polarized glasses 200, the first image can be visually recognized with high image quality.

Figure 16:
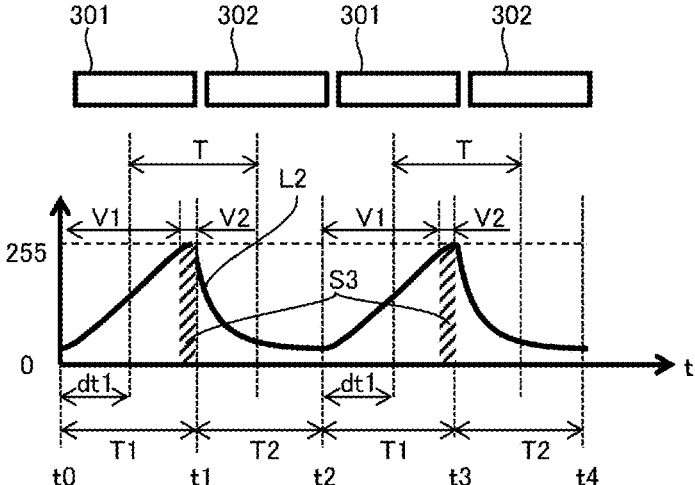
FIG. 16 is a diagram for explaining luminance visually recognized by a viewer when wearing polarized glasses.
Figure 17:
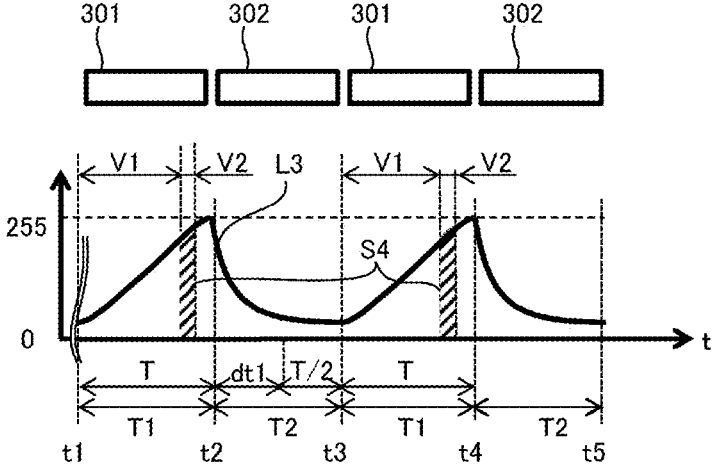
FIG. 17 is a diagram for explaining luminance visually recognized by a viewer when wearing polarized glasses.

FIGS. 16 and 17 are diagrams for explaining the luminance visually recognized by the viewer A when wearing the polarized glasses 200. In FIGS. 16 and 17, a horizontal axis represents passage of time. A vertical axis represents the luminance of the display panel 12 as a gray scale value. A curve L2 in FIG. 16 and a curve L3 in FIG. 17 represent changes in instantaneous luminance of a pixel (the second target pixel described above) having a gray scale of 255 as a pixel value in the first image 301. FIG. 16 illustrates a change in instantaneous luminance when the second target pixel is located near the upper end 12U of the display panel 12. The curve L2 in FIG. 16 is the same as the curve L2 in FIG. 9. FIG. 17 illustrates a change in instantaneous luminance when the second target pixel is located near the lower end 12D of the display panel 12.

When the second target pixel is located near the upper end 12U of the display panel 12 (FIG. 16), the first image 301 is written at times to and t2 when writing of the first image is started and is displayed until times t1 and t3. After the non-lighting period V1 from times to and t2, the backlight 13 is turned on. In the lighting period V2, the first image 301 is illuminated. After the time difference dt1, the upper segment 11A is in the first polarization state. The lighting period V2 is included in the period during which the upper segment 11A is in the first polarization state. Therefore, when the viewer A is wearing the polarized glasses 200, the first image 301 illuminated during the lighting period V2 is visually recognized. Accordingly, the luminance visually recognized by the viewer A in this case is an integrated value of the curve L2 during a visually recognized period, which corresponds to the lighting period V2. The integrated value of the curve L2 during the lighting period V2 is a hatched area S3 in FIG. 16.

In the example in FIG. 10, the polarization state of the lower segment 11B is switched by being shifted by half the frame (T/2) from the upper segment 11A. Therefore, a positional relationship of the second target pixel located near the upper end 12U of the display panel 12 relative to the upper segment 11A is equal to a positional relationship of the second target pixel located slightly below the center of the display panel 12 relative to the lower segment 11B. Accordingly, also when the second target pixel is located slightly below the center of the display panel 12, the luminance that the viewer A visually recognizes when wearing the polarized glasses 200 is the area S3 in FIG. 16.

When the second target pixel is located near the lower end 12D of the display panel 12 (FIG. 17), the first image 301 is written at a time delayed by time taken for writing from times to and t2 at which writing of the first image is started, that is, after one frame time T from times to and t2 (at times t1 and t3), and is displayed until times t2 and t4. After the non-lighting period V1 from times t1 and t3, the backlight 13 is turned on. In the lighting period V2, the first image 301 is illuminated. At a time point shifted by half a frame (T/2) after the time difference dt1 from times to and t2, the lower segment 11B is in the first polarization state. The lighting period V2 is included in the period during which the lower segment 11B is in the first polarization state. Therefore, when the viewer A is wearing the polarized glasses 200, the first image 301 illuminated during the lighting period V2 is visually recognized. Accordingly, the luminance visually recognized by the viewer A in this case is an integrated value of the curve L3 during a visually recognized period, which corresponds to the lighting period V2. The integrated value of the curve L3 during the lighting period V2 is a hatched area S4 in FIG. 17.

In the example in FIG. 10, the polarization state of the lower segment 11B is switched by being shifted by half the frame (T/2) from the upper segment 11A. Therefore, a positional relationship of the second target pixel located near the lower end 12D of the display panel 12 relative to the lower segment 11B is equal to a positional relationship of the second target pixel located slightly above the center of the display panel 12 relative to the upper segment 11A. Accordingly, also when the second target pixel is located slightly above the center of the display panel 12, the luminance that the viewer A visually recognizes when wearing the polarized glasses 200 is the area S4 in FIG. 17.

In the display system 100 according to the present embodiment, the polarization module 11 is divided into the multiple segments in the direction D, and the polarization states of the segments are sequentially switched along the direction D with a shift. Thus, compared to a case in which the polarization state of an entire polarization module 11 is uniformly switched at the start of each frame, differences in luminance (unevenness) of the first image 301 that are visually recognized when the viewer A is wearing the polarized glasses 200 are suppressed.

In the display system 100 according to the present embodiment, the light-emitting face of the backlight 13 is divided into the multiple segments in the direction D, and the segments are sequentially turned on, segment by segment, along the direction D. In the display panel 12, during a period when an image is written in an area corresponding to one segment of the backlight 13, this segment is turned off at first and turned on at the end of the period during which the image is written in this area. In the display period of the first image 301, the lighting period V2 of the light source of the backlight 13 at each divided position is included in a period when the first image 301 is written at the corresponding position on the display panel 12 and the polarization module 11 is in the first polarization state. Thus, the first image 301 is illuminated with stable luminance at each position on the display panel 12 in the direction D. The BL drive unit 17 controls similarly during the display period of the second image 302, so that the second image 302 is illuminated with stable luminance at each position on the display panel 12 in the direction D.

The timing difference in switching the polarization states between the upper segment 11A and the lower segment 11B is not limited to one half of one frame time (T/2) and may be any other time difference. The timing difference in switching the polarization states between the upper segment 11A and the lower segment 11B may be set in accordance with the writing response of the display panel 12 or the like or may be set in accordance with the response speed of the polarization module 11. The division of the polarization module 11 in the direction D is not limited to two divisions. The polarization module 11 may be divided into three or more parts in the direction D.

The timings of turning off and turning on the segments 13A to 13H of the backlight 13, the length of the light-out period, and the length of the lighting period are not limited to those exemplified above and may be other values. The length of the light-out period and the length of the lighting period may be set in accordance with the writing response of the display panel 12, the response speed of the polarization module 11, or the like. The number of segments of the backlight 13 is not limited to eight, and the backlight 13 may be divided into more than eight or may be divided into seven or less.

Second Embodiment

Control of the backlight 13 may include making the amount of light emitted from the backlight 13 different between the first image period T1 in which the first image is displayed and the second image period T2 in which the second image is displayed. Making the amount of light emitted from the backlight 13 different between the first image period T1 and the second image period T2 means, as an example, making the lengths of the non-lighting period and the lighting period different between the first image period T1 and the second image period T2. In other words, making the amount of light emitted from the backlight 13 different between the first image period T1 and the second image period T2 means making the ratio of the non-lighting period and the lighting period in the image period different between the first image period T1 and the second image period T2. In the display system 100 according to a second embodiment, the ratio of the non-lighting period and the lighting period is different between the first image period T1 and the second image period T2. As an example, in the display system 100 according to the second embodiment, the non-lighting period and the lighting period are made different for each frame in accordance with characteristics such as response conditions of the display panel 12 and the polarization module 11.

Figure 18:
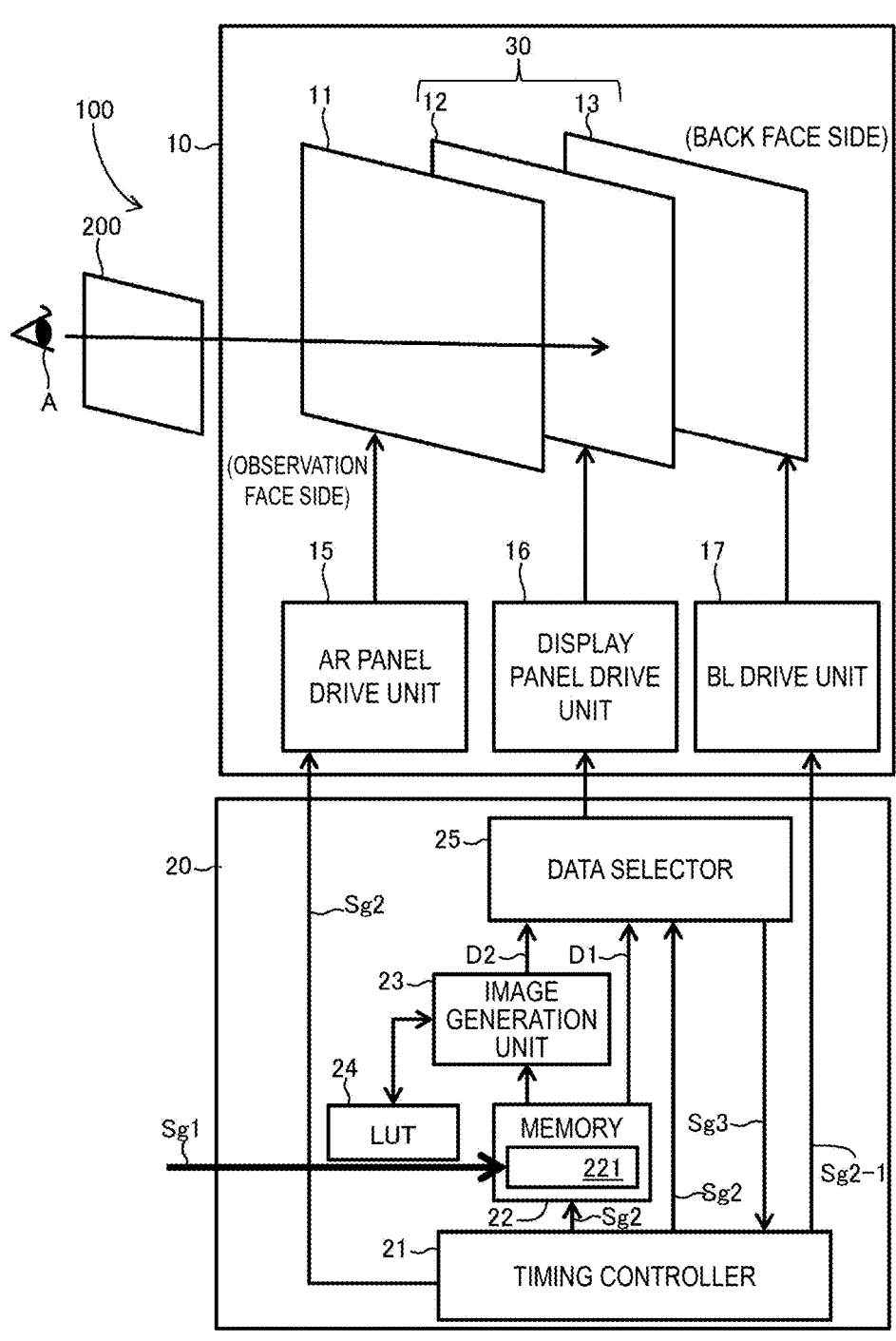
FIG. 18 is a schematic configuration diagram of a display system according to a second embodiment.

FIG. 18 is a schematic configuration diagram of the display system 100 according to the second embodiment. The display system 100 according to the second embodiment is different from the display system 100 according to the first embodiment (FIG. 1) in that the timing controller 21 receives a signal Sg3 from the data selector 25 indicating whether the image data output to the display panel drive unit 16 is the first image data D1 or the second image data D2. In this case, the display system 100 according to the second embodiment is different from the display system 100 according to the first embodiment (FIG. 1) in that the timing controller 21 outputs a synchronization signal Sg2-1 corresponding to the signal Sg3 to the BL drive unit 17 instead of the synchronization signal Sg2 in the display system 100 according to the first embodiment. The synchronization signal Sg2-1 is a signal used to determine whether the first image is to be displayed or the second image is to be displayed on the display panel 12.

Figure 19:
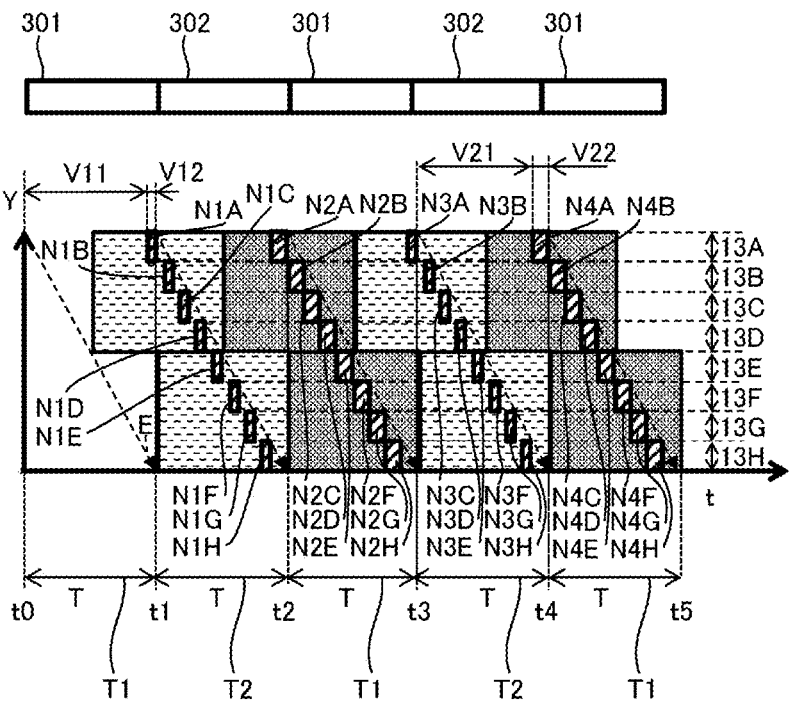
FIG. 19 is a diagram for explaining an example of non-lighting periods and lighting periods in the display system according to the second embodiment.

FIG. 19 is a diagram for explaining an example of non-lighting periods and lighting periods in the display system 100 according to the second embodiment. In the display system 100 according to the second embodiment, the BL drive unit 17 makes the non-lighting period and the lighting period different between the first image period T1 and the second image period T2 based on the synchronization signal Sg2-1. In FIG. 19, the lighting periods of the segments 13A to 13H when the first image 301 is sequentially written from start time t0 are represented by hatched portions N1A to N1H, respectively, the lighting periods of the segments 13A to 13H when the second image 302 is sequentially written from start time t1 are represented by hatched portions N2A to N2H, respectively, the lighting periods of the segments 13A to 13H when the first image 301 is sequentially written from start time t2 are represented by hatched portions N3A to N3H, respectively, and the lighting periods of the segments 13A to 13H when the second image 302 is sequentially written from start time t3 are represented by hatched portions N4A to N4H, respectively. In the example in FIG. 19, for the first segment 13A, the BL drive unit 17 makes a non-lighting period V11 in the first image period T1 longer than a non-lighting period V21 in the second image period T2 and makes a lighting period V12 in the first image period T1 shorter than a lighting period V22 in the second image period T2. As another example, for the first segment 13A, the BL drive unit 17 may make the non-lighting period V11 in the first image period T1 shorter than the non-lighting period V21 in the second image period T2 and may make the lighting period V12 in the first image period T1 longer than the lighting period V22 in the second image period T2. The same applies to the segments 13B to 13H.

The lengths of the non-lighting period and the lighting period in the first image period T1 and the lengths of the non-lighting period and the lighting period in the second image period T2 may be set in accordance with characteristics such as response conditions of the display panel 12 and the polarization module 11. The BL drive unit 17 stores in advance the lengths of the non-lighting period, the lighting period, the non-lighting period, and the lighting period. The BL drive unit 17 turns off the backlight 13 during the corresponding non-lighting period based on the synchronization signal Sg2-1. After the non-lighting period, the BL drive unit 17 turns on the backlight 13 only during the corresponding lighting period. Thus, the amount of light emitted from the backlight 13 can be made different between the first image period T1 and the second image period T2.

Making the amount of light emitted from the backlight 13 different between the first image period T1 and the second image period T2 is not limited to making the lengths of the non-lighting period and the lighting period different between the first image period T1 and the second image period T2. Making the amount of light emitted from the backlight 13 different between the first image period T1 and the second image period T2 may be, as another example, making the current value applied to the light source of the backlight 13 different between the first image period T1 and the second image period T2, making the duty ratio different between on and off of the light source (e.g., LED) of the backlight 13, or a combination thereof.

In contrast to the case where the amount of light emitted from the backlight 13 is the same between the first image period T1 and the second image period T2 (first embodiment), by making the amount of light emitted from the backlight 13 different between the first image period T1 and the second image period T2, the integrated luminance during the lighting period of the backlight 13 can be made different. Thus, the luminance of the image perceived by the viewer A when not wearing the polarized glasses 200 can be made different from the case where the amount of light emitted from the backlight 13 is the same between the first image period T1 and the second image period T2.

Generating the second image data D2 from the first image data D1 in the image generation unit 23 may be dividing the first image 301 into multiple areas and changing the pixel values of pixels belonging to each area to pixel values having a predetermined corresponding relationship or may be using at least two or more corresponding relationships for the multiple areas.

Figure 20:
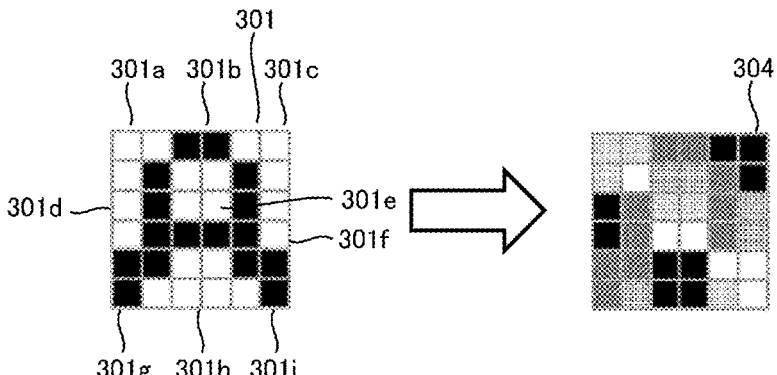
FIG. 20 is a diagram for explaining an example of a method of generating second image data from first image data in the display system according to the second embodiment.

FIG. 20 is a diagram for explaining an example of a method of generating the second image data D2 from the first image data D1 in the display system 100 according to the second embodiment. The image generation unit 23 changes pixel values of pixels belonging to each of multiple areas 301a to 301i predefined for the first image data D1 using a corresponding relationship selected from the multiple corresponding relationships defined in the LUT 24.

FIG. 21 is a diagram showing another example of the LUT 24. The LUT 24 in FIG. 21 defines multiple datasets 243, 244, and 245 of pixel values of the second image data D2 that correspond to the pixel values 241 of the first image data D1. To be specific, the LUT 24 in FIG. 21 defines the dataset (dataset A) 243 of pixel values Ua, . . . , Va, Wa, . . . , Xa, Ya, . . . , 0 of the second image, the dataset (dataset B) 244 of pixel values Ub, . . . , Vb, Wb, . . . , Xb, Yb, . . . , Zb of the second image, and the dataset (dataset C) 245 of pixel values Uc, . . . , Vc, Wc, . . . , Xc, Yc, . . . , Zc of the second image corresponding to the pixel values 0 to 255 of the first image data D1.

Figure 22:
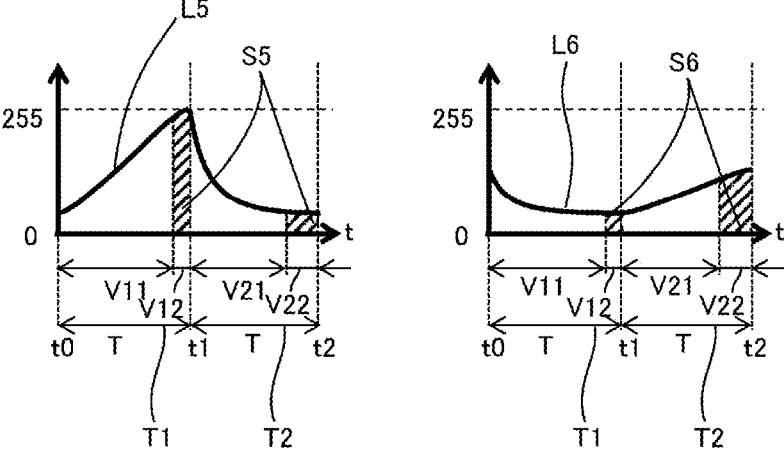
FIG. 22 is a diagram for explaining a relationship of a dataset A defined in the LUT in FIG. 21.

FIG. 22 is a diagram for explaining a relationship of the dataset A defined in the LUT 24 in FIG. 21. In FIG. 22, time t0 to t1 is the first image period T1, and time t1 to t2 is the second image period T2. During the lighting period V12 of the first image period T1, the backlight 13 is turned on, and the first image is illuminated from the display panel 12. During the lighting period V22 of the second image period T2, the backlight 13 is turned on, and the second image is illuminated from the display panel 12.

The dataset A is a combination of pixel values of the first image data D1 and the second image data D2 that provides minimum luminance that the viewer A visually recognizes when not wearing the polarized glasses 200. A curve L5 in FIG. 22 represents a change in instantaneous luminance of a pixel having a gray scale of 255 as a pixel value in the first image (the second target pixel described above). In the dataset A, a pixel in the second image corresponding to the second target pixel in the first image is set to a gray scale of 0. The luminance that the viewer A visually recognizes when not wearing the polarized glasses 200 in the curve L5 in FIG. 22, that is, the integrated luminance, is the integrated value of the curve L5 during the lighting period V12 and the lighting period V22, which is a hatched area S5.

The gray scale values of the pixels in the second image of the dataset A that correspond to other pixels in the first image are determined by measuring or calculating the integrated luminance to match the area S5. In the case of the example in FIG. 22, a Ua gray scale, which is the pixel value of the second image corresponding to the pixel having the pixel value of a gray scale of 0 in the first image (the first target pixel described above) is determined by measuring or calculating such that the integrated value of a curve L6, which is the change in the instantaneous luminance, during the lighting period V12 and the lighting period V22 (area S6) becomes the area S5.

Similarly, for the datasets B and C, the gray scale values of the pixels in the second image corresponding to other pixels in the first image are determined by measuring or calculating the integrated luminance values during the lighting period V12 and the lighting period V22, respectively, to match the integrated luminance values during the lighting period V12 and the lighting period V22 when the pixel in the second image corresponding to the second target pixel in the first image are set to Zb and Zc gray scales.

In the example in FIG. 21, the LUT 24 defines the datasets A, B, and C of pixel values of the second image data D2, corresponding to the pixel value 241 of the first image data D1, but the LUT 24 may define four or more datasets, or may define two datasets.

What defines the relationship between the pixel values in the first image data D1 and the pixel values in the second image data D2 is not limited to the table format as shown in FIG. 21. As another example, multiple tables prepared for each range of pixel values of the first image data D1 may be used, or multiple arithmetic equations may be used. The LUT 24 may define a relationship between the pixel values of the first image data D1 and the pixel values of the second image data D2 for each of the color pixels of R, G, and B, or may define a relationship between the pixel values of the first image data D1 and the pixel values of the second image data D2 in common for the color pixels of R, G, and B.

The multiple areas may be two or more. As an example, the image generation unit 23 divides the first image 301 into predefined areas, each area being, for example, 10 pixels×10 pixels. For example, one area may be 1 pixel×1 pixel, so that each pixel of the display panel 12 may be an area. A size of the area is not limited to a specific size and may be determined by predefined conditions. A shape of the area is neither limited to a particular shape. The image generation unit 23 selects a dataset of pixel values of the second image to be used for each area from the multiple datasets A, B, and C defined in the LUT 24. The image generation unit 23 generates the second image data D2 by converting the pixel values of the pixels belonging to each area of the first image data D1 using the dataset of pixel values of the second image determined for each area.

A method of selecting the dataset of pixel values of the second image used for each area from the multiple datasets A, B, and C defined in the LUT 24 is not limited to a specific method. At least two datasets among the multiple datasets A, B, and C may be used for the first image data D1. The image generation unit 23 may randomly select the datasets or may select the datasets in accordance with a specific user operation. For example, the image generation unit 23 may select the datasets based on a range of gray scale for each area, that is, a minimum value and a maximum value of gray scales, an average value of gray scales, or the like. Preferably, a dataset is selected in which the difference between the pixel values of the first image data D1 and the pixel values of the second image data D2 is small. Thus, the influence of crosstalk due to response can be suppressed, and the viewer A can easily visually recognize the first image 301 when wearing the polarized glasses 200. As another example, among the multiple areas of the first image data D1, the image generation unit 23 may set a predefined specific gray scale value (e.g., a gray scale of 0) for a specific area and select a dataset of pixel values of the second image to be used for other areas.

In the display system 100 according to the first embodiment, when the viewer A is not wearing the polarized glasses 200, the entire screen of the display panel 12 is visually recognized with the same luminance. In this situation, by short repetition interval of pixels with different gray scales for each frame, the first image 301 may be instantaneously perceived by the eye tracking integration effect due to blinking, a sudden shift of eye gaze, or the like when the viewer A is not wearing the polarized glasses 200.

On the other hand, in the display system 100 according to the second embodiment, the pixel values are converted using the corresponding relationships selected for each area of the first image 301 to generate the second image data D2. Thus, in the display system 100 according to the second embodiment, the pattern that the viewer A visually recognizes when not wearing the polarized glasses 200 is discontinuous, that is, the entire display panel 12 is visually recognized by the viewer A to be non-uniform. Therefore, the pattern of the first image 301 is less likely to be perceived even when blinking, a sudden shift of eye gaze, or the like occurs. Accordingly, confidentiality of the first image 301 can be enhanced.

Figure 23:
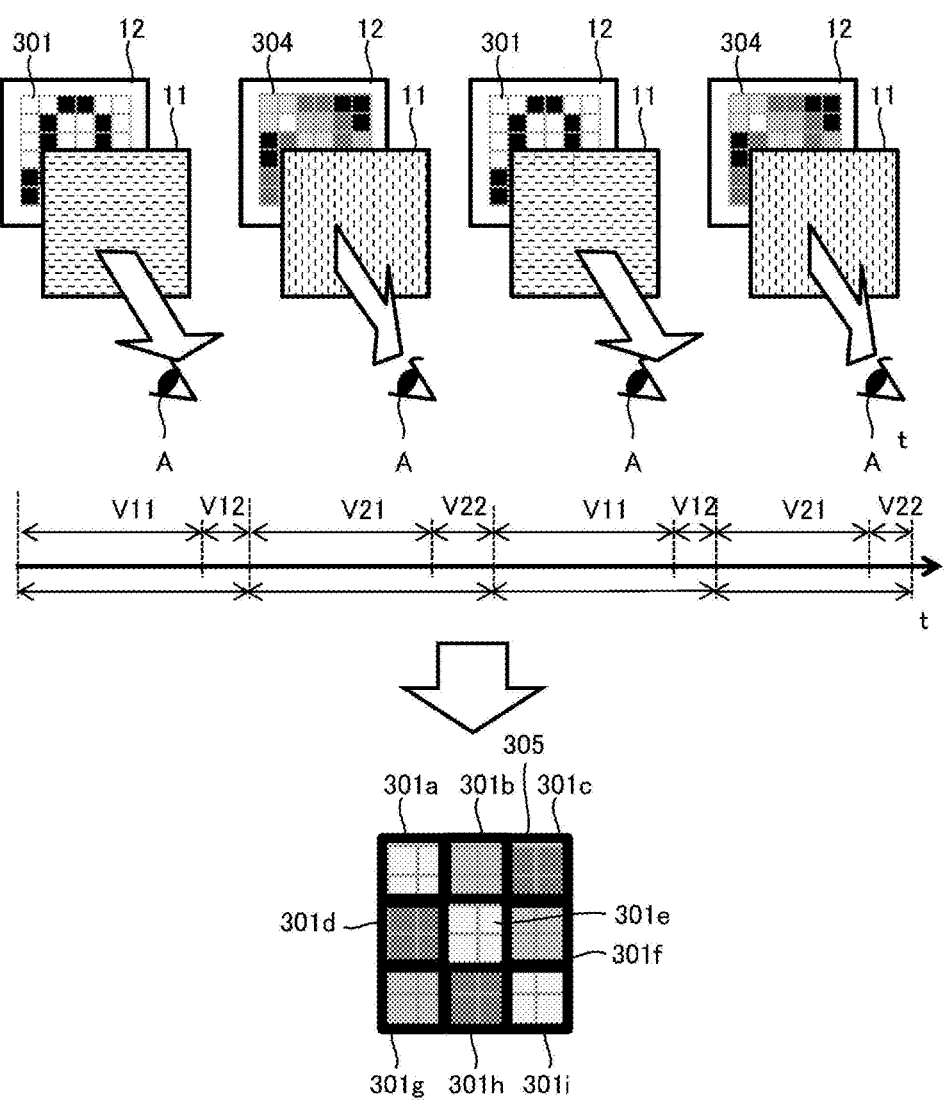
FIG. 23 is a schematic diagram illustrating an example of a display of a display panel, a polarization state of a polarization module, and an image perceived by a viewer in the display system according to the second embodiment.

In the display system 100 according to the second embodiment, when the viewer A is not wearing the polarized glasses 200, a fourth image 305, which is a composite of the first image 301 and a second image 304, is perceived. FIG. 23 is a schematic diagram illustrating an example of a display of the display panel 12, a polarization state of the polarization module 11, and an image perceived by the viewer A when the viewer A is not wearing the polarized glasses 200 in the display system 100 according to the second embodiment.

In FIG. 23, the first image 301 is illuminated from the display panel 12 during the lighting period from time t0 to time t1 and the lighting period from time t2 to time t3. At times t0 and t2, the polarization module 11 is switched to the first polarization state. The second image 304 is illuminated from the display panel 12 during the lighting period from time t1 to time t2 and the lighting period from time t3 to time t4. At times t1 and t3, the polarization module 11 is switched to the second polarization state.

When the viewer A is not wearing the polarized glasses 200, the fourth image 305, which is a composite of the first image 301 and the second image 304, is perceived. The integrated luminance values of the pixels are equal in each of the areas 301a to 301i of the first image 301 and the second image 304. Therefore, each of the areas 301a to 301i of the fourth image 305 has a specific gray scale, such as a gray image.

Furthermore, since two or more datasets are used to generate the second image 304, there are at least two types of integrated luminance values for the areas 301a to 301i. Therefore, the areas 301a to 301i of the fourth image 305 do not have a specific gray scale as a whole but have at least two types of gray scales.

Thus, in the display system 100 according to the second embodiment, the image patterns perceived when the viewer A is not wearing the polarized glasses 200 can be changed. It is also possible to make the areas in which the pattern of the first image can be perceived by blinking or the like small and discontinuous. Therefore, the confidentiality of the first image 301 can be ensured.

Sizes of the areas 301a to 301i do not necessarily have to be constant (identical). As another example, the size of each of the areas 301a to 301i may be determined in accordance with content included in the first image 301. As an example, when the first image 301 includes characters, a size may correspond to a font size. In this case, for example, the image generation unit 23 may identify the font size from information contained in the image signal Sg1 and may determine the size of each of the areas 301a to 301i based on a pre-stored corresponding relationship between the font size and the area size.

In the above-described embodiments, an example in which the number of segments of the backlight 13 is eight is described, but the number of segments of the backlight 13 is not limited to eight, and the backlight 13 may be divided into eight or more or may be divided into seven or less.

First Modified Example

Further, the backlight 13 is not limited to a scanning backlight in which the light-emitting face is divided into multiple parts. The backlight 13 may have a light-emitting face that is turned off and on as a whole.

Figure 24:
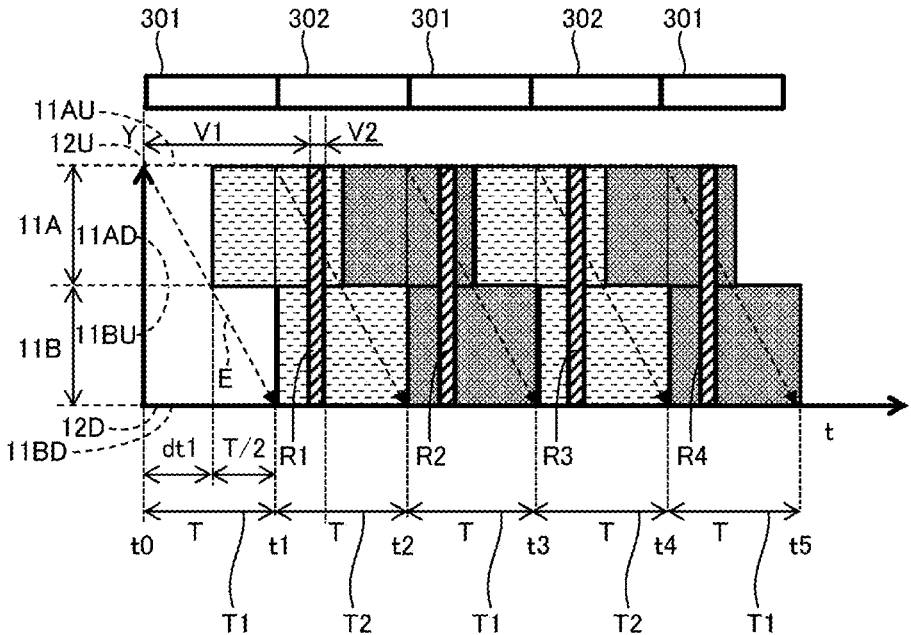
FIG. 24 is a schematic diagram for explaining a relationship between a display of a display panel, a polarization state of a polarization module, and a lighting state of a backlight in a display system according to a modified example.

FIG. 24 is a schematic diagram for explaining a relationship between a display on the display panel 12, a polarization state of the polarization module 11, and a lighting state of the backlight 13 in the display system 100 according to a first modified example. A horizontal axis (Y-axis) in FIG. 24 represents passage of time. A vertical axis (Y-axis) in FIG. 24 represents positions of the polarization module 11, the display panel 12, and the backlight 13 in the direction D.

In the display system according to the first embodiment, the relationship between the display of the display panel 12, the polarization state of the polarization module 11, and the lighting state of the backlight 13 is as illustrated in FIG. 10. On the other hand, in the display system 100 according to the first modified example, the BL drive unit 17 turns off the entire backlight 13 during the non-lighting period and then turns on the entire backlight 13 only during the lighting period based on the synchronization signal Sg2 from the timing controller 21.

In this case, the lighting period is a period during which the first image 301 is written on the display panel 12 in the first image period T1 and includes many areas in which the polarization module 11 is in the first polarization state. Preferably, the lighting period is a period during which the first image 301 is written near the screen center of the display panel 12 and includes areas in which the polarization module 11 is in the first polarization state. Alternatively, preferably, the lighting period is a period during which the first image 301 is written on the display panel 12 in the first image period T1 and includes the most areas in which the polarization module 11 is in the first polarization state. The lighting period V2 is a period during which the second image 302 is written on the display panel 12 in the second image period T2 and includes many areas in which the polarization module 11 is in the second polarization state. Preferably, the lighting period V2 is a period during which the second image 302 is written on the display panel 12 in the second image period T2 and includes the most areas in which the polarization module 11 is in the second polarization state. In FIG. 24, the lighting period V2 of the backlight 13 during the period from writing start time t0 of the first image 301 to writing start time t1 of the second image 302 (the period corresponding to one frame length T) is represented by a hatched portion R1. The lighting period of the backlight 13 during the period from writing start time t1 of the second image 302 to writing start time t2 of the first image 301 is represented by a hatched portion R2. The lighting period of the backlight 13 during the period from writing start time t2 of the first image 301 to writing start time t3 of the second image 302 is represented by a hatched portion R3. The lighting period of the backlight 13 during the period from writing start time t3 of the second image 302 to writing start time t4 of the first image 301 is represented by a hatched portion R4.

Thus, when the backlight 13 includes one light source or multiple light sources that are uniformly controlled to be turned on and off, the luminance of the image illuminated from the display panel 12 can be stabilized. Thus, the viewer can visually recognize an image with high image quality.

Second Modified Example

The BL drive unit 17 may control the backlight 13 synchronized with the display switching timing in conjunction with so-called local dimming control. Local dimming refers to control in which the backlight 13 is divided into multiple parts and necessary parts are turned on and off in accordance with an image to be displayed on the display panel 12.

3. Supplementary Note

Note that the disclosure is not limited to the above-mentioned embodiments, and it is possible to make various changes.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A display device comprising:
a display panel;
a polarization module placed overlapping the display panel, the polarization module being capable of actively switching a polarization state between a first polarization state and a second polarization state;
a backlight placed overlapping the display panel; and
a controller,
wherein the controller is configured to:
generate second image data from first image data,
cause the display panel to display a first image, based on the first image data, and a second image, based on the second image data, in a time division manner,
switch the polarization state of the polarization module to the first polarization state in a case in which the first image is displayed, and to the second polarization state in a case in which the second image is displayed in synchronization with a timing of the time division, and
by controlling the backlight, turn off the backlight for a predetermined period from a start of a display period, during which the first image or the second image is displayed on the display panel, and then turn on the backlight,
wherein the polarization module is divided into a first plurality of segments along a scanning direction,
switching the polarization state of the polarization module includes switching all polarization states of the first plurality of segments of the polarization module in turn along the scanning direction with a time difference,
controlling the backlight includes turning on the backlight during a period, in which all polarization states of the first plurality of segments of the polarization module are:
in the first polarization state in a case in which the first image is displayed, or
in the second polarization state in a case in which the second image is displayed,
a light-emitting face of the backlight is divided into a second plurality of segments, and
controlling the backlight further includes turning off the first plurality of segments one by one in turn along the scanning direction in the display panel for the predetermined period from a start of writing the first image or the second image to an area, in the display panel, corresponding to each of the first plurality of segments, and then turning on the second plurality of segments.

2. The display device according to claim 1,
wherein controlling the backlight further includes turning on the backlight during a period in which all polarization states of the first plurality of segments of the polarization module are in the first polarization state or the second polarization state.

3. The display device according to claim 1,
wherein controlling the backlight further includes making an amount of light emitted from the backlight different between a first display period, during which the first image is displayed, and a second display period, during which the second image is displayed.

4. The display device according to claim 3,
wherein making the amount of light emitted from the backlight different includes making a length of a period, during which the backlight is turned on, different between the first display period.

5. The display device according to claim 1,
wherein, in the first polarization state, the first image is visually recognized by a viewer through polarized glasses worn by the viewer, and
in the second polarization state, the second image is not visually recognized by the viewer through the polarized glasses.

6. The display device according to claim 1,
wherein generating the second image data includes converting a gray scale of the first image data into a gray scale with a predefined corresponding relationship.

7. The display device according to claim 1,
wherein generating the second image data includes dividing the first image data into a plurality of areas and changing to gray scales with predefined corresponding relationships selected for the plurality of areas, and
the predefined corresponding relationships selected for the plurality of areas include at least two types of corresponding relationships.

\* \* \* \* \*